(12) United States Patent  
Akiyoshi

(10) Patent No.: US 10,149,331 B2  
(45) Date of Patent: Dec. 4, 2018

(54) COMMUNICATION SYSTEM, SERVING GATEWAY, COMMUNICATION METHOD THEREFOR, AND BASE STATION

(71) Applicant: NEC Corporation, Minato-ku, Tokyo (JP)

(72) Inventor: Ippei Akiyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 14/903,852

(22) PCT Filed: Jul. 10, 2014

(86) PCT No.: PCT/JP2014/003675  
§ 371 (c)(1),  
(2) Date: Jan. 8, 2016

(87) PCT Pub. No.: WO2015/004922  
PCT Pub. Date: Jan. 15, 2015

(65) Prior Publication Data  
US 2016/0157274 A1    Jun. 2, 2016

(30) Foreign Application Priority Data

Jul. 11, 2013 (JP) .................. 2013-145925

(51) Int. Cl.  
*H04W 88/16* (2009.01)  
*H04W 76/10* (2018.01)  
(Continued)

(52) U.S. Cl.  
CPC ......... *H04W 76/10* (2018.02); *H04L 12/4633* (2013.01); *H04W 88/16* (2013.01); *H04W 92/24* (2013.01)

(58) Field of Classification Search  
CPC ...... H04W 76/02; H04W 88/16; H04W 92/24  
See application file for complete search history.

(56) References Cited

U.S. PATENT DOCUMENTS 5,280,469 A * 1/1994 Taniguchi ............... H04L 43/00  
                                               370/250  
6,185,213 B1 * 2/2001 Katsube .................... H04L 5/14  
                                               370/396

(Continued)

FOREIGN PATENT DOCUMENTS

WO    2012/039176 A1    3/2012

OTHER PUBLICATIONS

Extended European Search Report for EP Application No. EP14823353.9 dated Dec. 12, 2016.

(Continued)

*Primary Examiner* — Rasheed Gidado

(57) ABSTRACT

A communication system, a serving gateway, a communication method, and a base station are provided that make it possible to flexibly increase/decrease a U-plane processing function of a communication apparatus. A communication system in which a logical path is configured in a network to perform communication, comprises: second gateways (740-1, 740-2), which are deployed for a plurality of first gateways (720-1, 720-2), respectively; a transport network (760), which the logical paths configured between a base station (770) and the second gateways pass through; and a control apparatus (710) that controls packet forwarding in the transport network, wherein the control apparatus controls the transport network so that a logical path to which a packet belongs is identified and the packet will be forwarded to the second gateway corresponding to the identified logical path.

8 Claims, 34 Drawing Sheets

(51) Int. Cl.
*H04L 12/46* (2006.01)
*H04W 92/24* (2009.01)

(56) References Cited

U.S. PATENT DOCUMENTS

| | | | |
|---|---|---|---|
| 2007/0091862 A1 | 4/2007 | Ioannidis | |
| 2007/0147398 A1* | 6/2007 | Upp | H04L 29/06027 370/401 |
| 2009/0232019 A1* | 9/2009 | Gupta | H04L 12/287 370/252 |
| 2010/0281157 A1* | 11/2010 | Ramankutty | H04W 24/08 709/224 |
| 2011/0188403 A1* | 8/2011 | Calippe | H04W 24/08 370/254 |
| 2012/0113989 A1 | 5/2012 | Akiyoshi | |
| 2012/0300615 A1 | 11/2012 | Kempf et al. | |
| 2013/0054761 A1 | 2/2013 | Kempf et al. | |
| 2013/0083773 A1* | 4/2013 | Watfa | H04W 36/0033 370/331 |
| 2013/0170435 A1 | 7/2013 | Dinan | |
| 2013/0305082 A1* | 11/2013 | Draznin | H04L 65/1069 714/4.1 |
| 2014/0003322 A1* | 1/2014 | Grinshpun | H04W 36/026 370/312 |
| 2015/0139096 A1* | 5/2015 | Morioka | H04W 28/08 370/329 |

OTHER PUBLICATIONS

Extended European Search Report for EP Application No. EP14823353.9 dated Apr. 11, 2017.
3rd Generation Partnership Project; Technical Specification Group Services and System Aspects; "General Packet Radio Service (GPRS) enhancements for Evolved Universal Terrestrial Radio Access Network (E-UTRAN) access" Release 12, 3GPP TR 23.401 V12.0.0, Mar. 2013.
James Kempf, Bengt Jahansson, Sten Pettersson, Harald Luning, Tord Nilsson, "Moving the Mobile Evolved Packet Core to the Cloud," IEEE 8th International Conference, Oct. 10, 2012, paragraph 2,3.
S.Matsushima, R.Wakikawa Stateless user-plane architecture for virtualized EPC (vEPC), draft-matsushima-stateless-uplane-vepc-00, IETF, Jul. 10, 2013, Paragraph 3.1.
International Search Report for PCT Application No. PCT/JP2014/003675, dated Sep. 30, 2014.
Japanese Office Action for JP Application No. 2015-526175 dated May 15, 2018 with English Translation.

* cited by examiner

FIG. 12  FIRST EXAMPLE

FIG. 29    THIRD EXEMPLARY EMBODIMENT

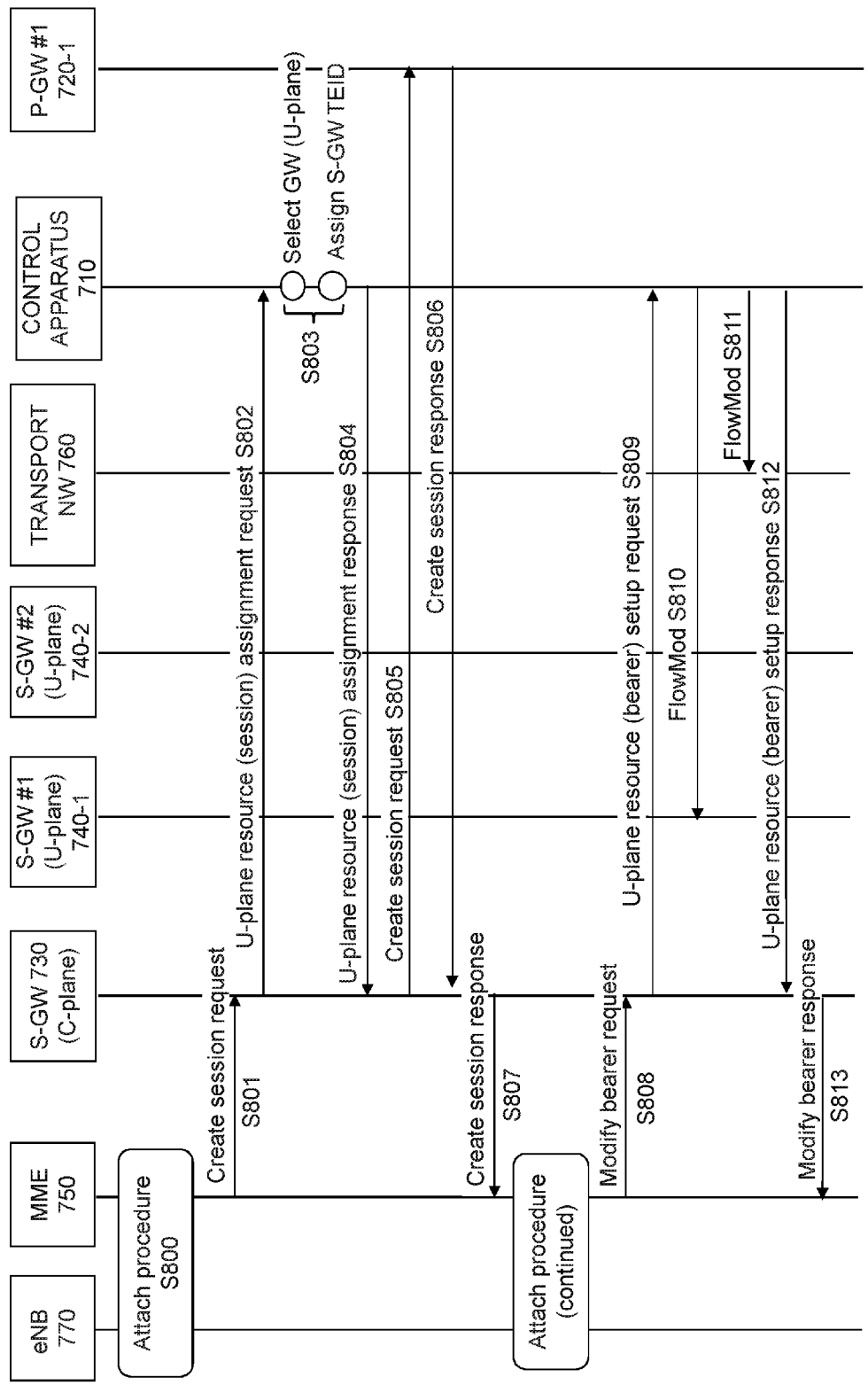

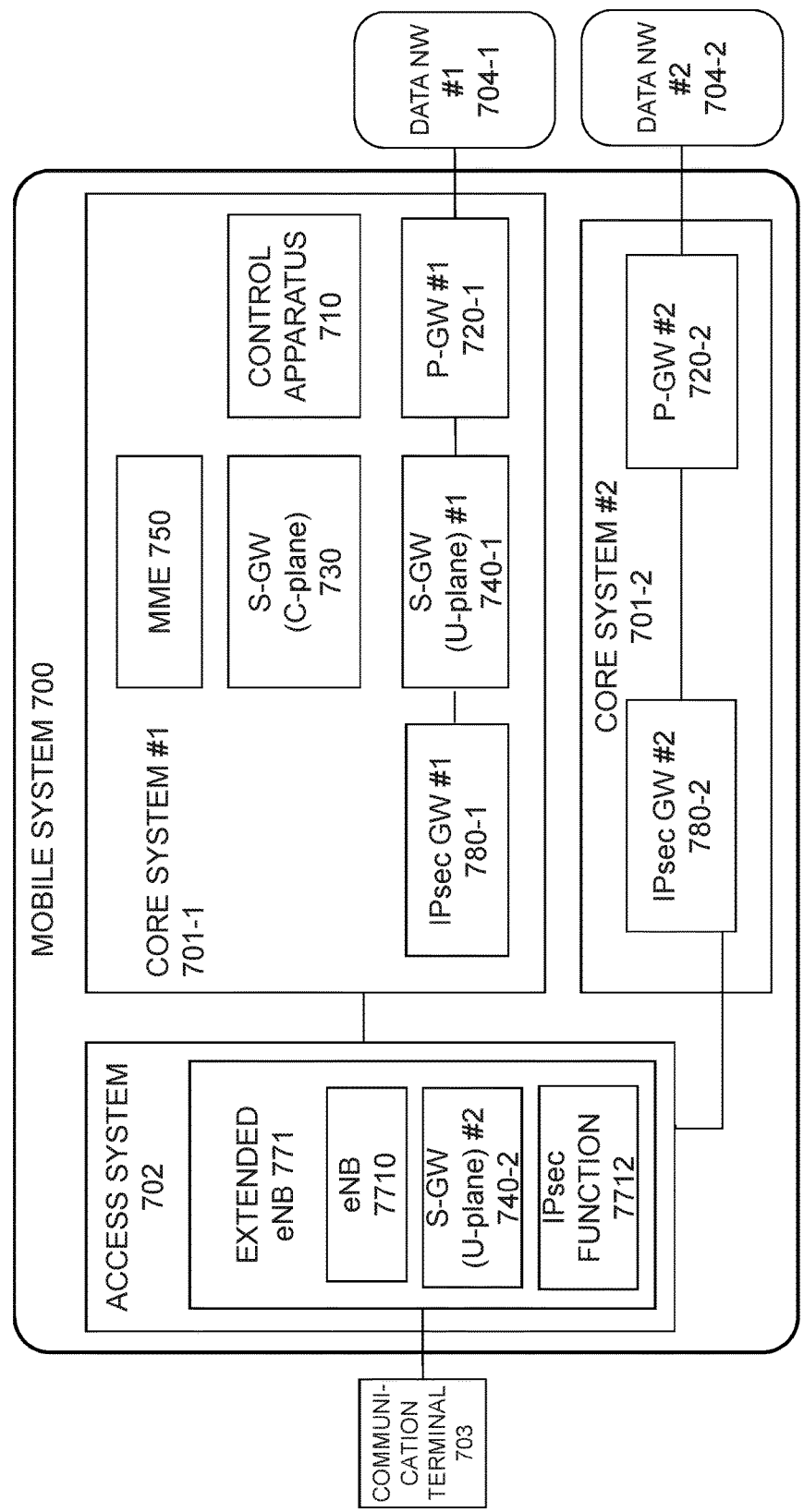

COMMUNICATION SYSTEM, SERVING GATEWAY, COMMUNICATION METHOD THEREFOR, AND BASE STATION

This application is a National Stage Entry of PCT/JP2014/003675 filed on, Jul. 10, 2014, which claims priority from Japanese Patent Application 2013-145925 filed on, Jul. 11, 2013 the contents of all of which are incorporated herein by reference, in their entirety.

TECHNICAL FIELD

The present invention relates to a communication system in which data communication is performed between communication apparatuses through a logical path and, more particularly, to a serving gateway, a communication method, and a base station in the communication system.

BACKGROUND ART

In existing wireless communication systems, a wireless terminal connects to a radio base station and thereby can access the Internet via a core network. At that time, the wireless terminal performs packet communication through a communication path (bearer) established between the radio base station it has connected to and a gateway apparatus provided in the core network. In order to provide the bearer, the radio base station and the gateway apparatus construct a tunnel by encapsulating packets. The tunnel that passes data packets is identified by tunnel identification information, which is set in the outer header of the packet.

For example, in the EPS (Evolved Packet System) using E-UTRAN (Evolved Universal Terrestrial Radio Access Network) described in NPL 1, a wireless terminal UE (User Equipment) can perform packet communication through an EPS bearer created between the UE and a P-GW (Packet Data Network Gateway). In this EPS bearer, logical paths for passing data packets that are terminated between a radio base station (eNodeB) and a S-GW (Serving GW) and between the S-GW and the P-GW, respectively, are called GTP-U (GRPS Tunneling Protocol for User plane) tunnel which is identified by a TEID (Tunnel Endpoint Identifier) in an outer header of a packet.

In a communication system as described above, an increase in mobile traffic can be dealt with by adding a S-GW and a P-GW as necessary.

CITATION LIST

Patent Literature

[NPL 1]
3GPP TR 23.401 V12.0.0 "General Packet Radio Service (GPRS) enhancements for Evolved Universal Terrestrial Radio Access Network (E-UTRAN) access", [retrieved on May 20, 2013] Internet <http://www.3gpp.org/ftp/Specs/html-info/23401.htm>

SUMMARY OF INVENTION

Technical Problem

However, since always-on IP connectivity is now required in LTE (Long Term Evolution), a connection with P-GW is automatically established when a wireless terminal UE accesses a mobile network. That is, a bearer is constructed between the wireless terminal UE and the P-GW at the moment the wireless terminal UE accesses the mobile network, and it will be maintained. Consequently, U-plane processing for forwarding traffic increases as user traffic grows, but, on the other hand, the share of C-plane processing for managing bearers becomes small relatively.

As described above, an increase in mobile traffic is dealt with by adding a GW (gateway apparatus). Accordingly, in case of a single-unit GW (gateway apparatus) with C-plane processing and U-plane processing integrated therein, the problem arises that the addition of GWs to deal with the increased loads of U-plane processing may cause excessive C-plane processing capacity, resulting in the declined processing efficiency of the GWs as a whole.

Accordingly, an object of the present invention is to provide a communication system, a communication apparatus, a control method, and a control apparatus that make it possible to flexibly increase/decrease a U-plane processing function of a communication apparatus.

Solution to Problem

A communication system according to the present invention is a communication system in which a logical path is configured in a network to perform communication, comprising: second gateways, which are deployed for a plurality of first gateways, respectively; a transport network, which the logical paths configured between a base station and the second gateways pass through; and a control apparatus that controls packet forwarding in the transport network, characterized in that the control apparatus controls the transport network so that a logical path to which a packet belongs is identified and the packet will be forwarded to the second gateway corresponding to the identified logical path.

A serving gateway according to the present invention is a serving gateway in a communication system including a plurality of PDN (Packet Data Network) gateways, comprising: first means capable of performing processing for terminating a first logical path with a PDN gateway associated with the serving gateway; second means capable of performing processing for terminating a second logical path with a base station; and third means capable of exchanging information related to the termination processing with at least one of the first and second means in accordance with an operation rule, which is notified from a control apparatus in response to a request from a control plane for the first and second logical paths.

A communication method according to the present invention is a communication method for a serving gateway in a communication system including a plurality of PDN (Packet Data Network) gateways, characterized by comprising: by a first logical path termination module, performing processing for terminating a first logical path with a PDN gateway associated with the serving gateway; by a second logical path termination module, performing processing for terminating a second logical path with a base station; and exchanging information related to the termination processing with at least one of the first and second logical path termination modules in accordance with an operation rule, which is notified from a control apparatus in response to a request from a control plane for the first and second logical paths.

A base station according to the present invention is a base station in a communication system including a plurality of PDN (Packet Data Network) gateways, comprising: a base station unit; and a serving gateway unit, characterized in that the serving gateway unit includes: means capable of translating a destination address of a packet belonging to a logical path for a communication with a predetermined communication network, to an address of a PDN gateway that corresponds to the predetermined communication network.

Advantageous Effects of Invention

According to the present invention, it is possible to flexibly increase/decrease a U-plane processing function of a communication apparatus.

BRIEF DESCRIPTION OF DRAWINGS

FIG. 33 is a sequence diagram showing an example of a procedure for default bearer construction at S-GW in the communication system shown in FIG. 30.

FIG. 34 is a schematic architecture diagram showing another example of the communication system according to the fourth exemplary embodiment of the present invention.

DESCRIPTION OF EMBODIMENTS

Systems according to exemplary embodiments of the present invention have an architecture in which a communication apparatus having C-plane processing function and a communication apparatus having U-plane processing function are separated. A control apparatus dynamically controls the U-plane processing function in response to a request from the communication apparatus having C-plane processing function. Accordingly, the present invention allows flexible increase/decrease in U-plane processing function. Hereinafter, exemplary embodiments and examples of the present invention will be described in detail with reference to drawings.

Figure 1:
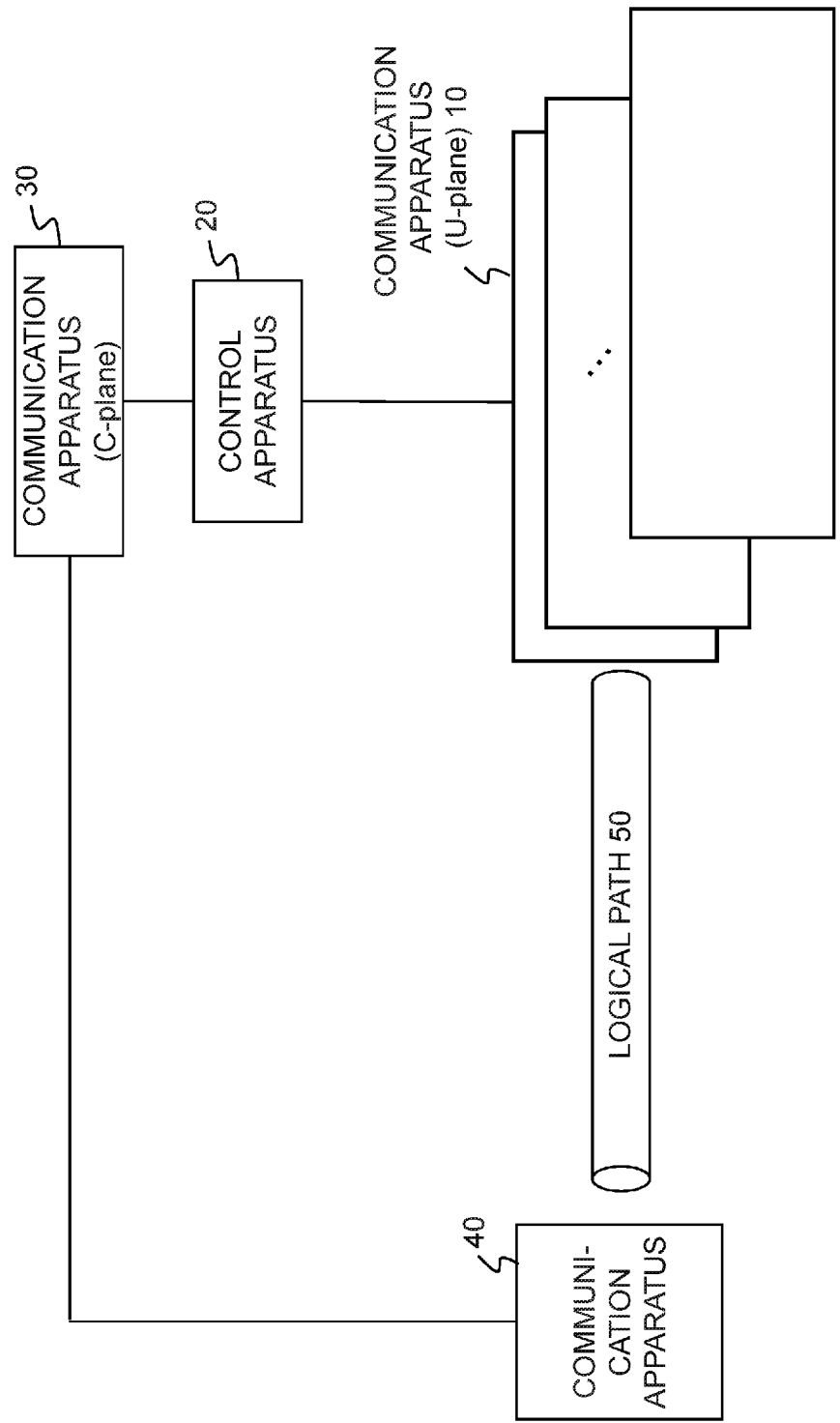
FIG. 1 is a schematic architecture diagram of a communication system according to a first exemplary embodiment of the present invention.

1. First Exemplary Embodiment
1.1) System Architecture
FIG. 1 shows an example of a system architecture according to a first exemplary embodiment. A communication system according to the first exemplary embodiment of the present invention includes a communication apparatus 10 for U-plane that performs data traffic processing, a control apparatus 20, a communication apparatus 30 for C-plane, and a communication apparatus 40 that communicates with the communication apparatus 10. It is assumed that a logical path 50 is created between the communication apparatus 10 for U-plane and the communication apparatus 40.

The communication system may include a plurality of communication apparatuses for U-plane 10. For example, the communication system pools a plurality of communication apparatuses 10 having U-plane processing function. The control apparatus 20 may select a communication apparatus 10 to be caused to operate as U-plane from the pool of communication apparatuses 10 (communication equipment resources comprising the plurality of communication apparatuses 10) in response to a request from the communication apparatus 30 for C-plane.

For example, the control apparatus 20 may select a communication apparatus 10 to be caused to operate as U-plane, depending on the communication state of the communication system. As an example, when the load on the communication system is higher than a predetermined threshold, the control apparatus 20 selects not a communication apparatus 10 that has already been operating as a U-plane function but a new communication apparatus 10 and causes it to operate as U-plane. Moreover, for example, when the load on the communication system is lower than a predetermined threshold, the control apparatus 20 selects a communication apparatus 10 that has already been operating as a U-plane function.

It is also possible that the control apparatus 20 selects a communication apparatus 10 to be caused to operate as U-plane, for example, depending on the type of the logical path 50. For example, the control apparatus 20 refers to a port number or the like included in the header of a packet to identify a service associated with the packet and, based on the type of this service, identifies the type of the logical path 50. For example, the control apparatus 20 selects a different communication apparatus 10 for each type of the logical path 50.

It is also possible that the control apparatus 20 selects a communication apparatus 10 to be caused to operate as U-plane, for example, depending on the type of a data network (Internet, IMS (IP Multimedia Subsystem), or the like) a terminal accesses. For example, the control apparatus 20 selects a different communication apparatus 10 for each data network. Note that the control apparatus 20 may also select a communication apparatus 10 to be caused to operate as U-plane, for example, depending on a PDN (Packet Data Network) gateway.

It is also possible that the control apparatus 20 selects a communication apparatus 10 to be caused to operate as U-plane, for example, depending on the location of a base station a terminal attaches to.

The communication system may pool communication apparatuses 10 having U-plane processing function. Moreover, the communication system may pool a plurality of general-purpose communication apparatuses 10 and construct a U-plane processing function in each communication apparatus 10 by using software such as VM (Virtual Machine). For example, the operator of the communication system constructs software having U-plane processing function in the communication apparatuses 10. Moreover, the control apparatus 20 may construct software having U-plane processing function in the communication apparatuses 10 in accordance with an instruction from the operator.

The control apparatus 20 controls the U-plane processing function of the communication apparatus(s) 10 in response to a request from the communication apparatus 30 for C-plane.

The communication apparatus 30 for C-plane has a function of bearer management, such as configuration, modification, and release of the logical path 50 (e.g., bearer) at the communication apparatus 10 for U-plane, and requests the control apparatus 20 to configure a U-plane logical path 50.

Figure 2:
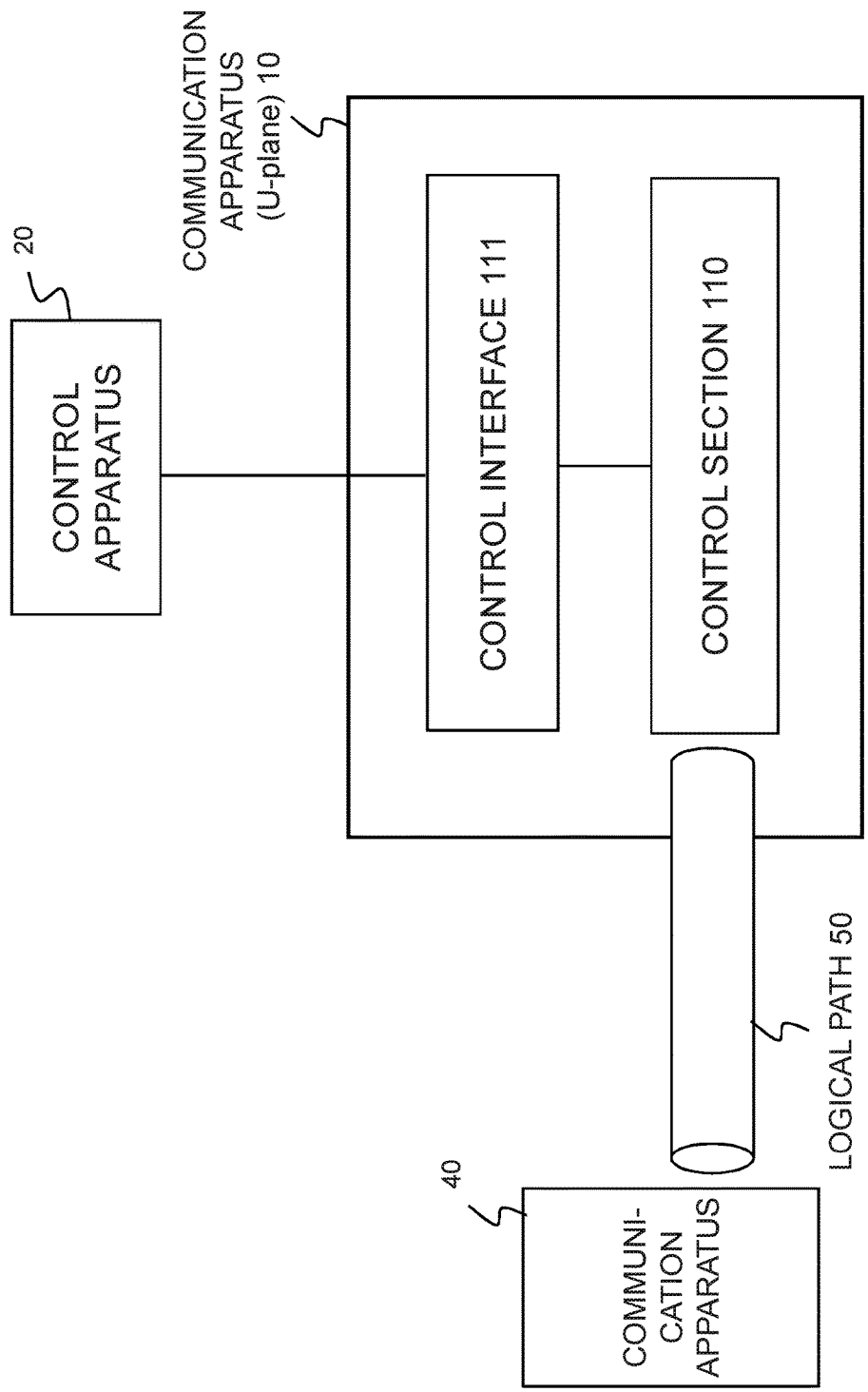
FIG. 2 is a block diagram showing a functional configuration of a communication apparatus according to the first exemplary embodiment of the present invention.

FIG. 2 shows an example of the configuration of the communication apparatus 10 for U-plane. A control interface 111 receives a command (an operation rule) from the control apparatus 20 in accordance with a predetermined control protocol. For the control protocol, for example, OpenFlow, I2RS (Interface to the Routing System), ForCES (Forwarding and Control Element Separation), or the like can be used. However, the above-mentioned protocols are recited as examples, and other control protocols can also be used.

A control section 110 operates as a U-plane processing function in accordance with a command from the control apparatus 20. For example, the control section 110 has a function of encapsulating and decapsulating a packet to be sent to or received from the communication apparatus 40. In other words, the control section 110 has a function of terminating the logical path 50 established with the communication apparatus 40. For example, the control section 110 receives a command including identification information for identifying the logical path 50 from the control apparatus 20 via the control interface 111. The control section 110, in accordance with such a command, encapsulates a packet based on the received identification information. Moreover, the control section 110, in accordance with such a command, decapsulates a packet corresponding to the identification information. A case is described with FIG. 2 in which the control section 110 terminates the logical path 50. If the logical path 50 is constructed in multiple stages in a cascaded manner, not a combination of decapsulating processing and encapsulating processing but a modification to information included in the outer header may be performed. Examples of the information to be modified include, but are not limited to, information for identifying a logical path included in the outer header, such as source and destination IP addresses and a Tunneling Endpoint Identifier (TEID).

The control section 110 performs processing for sending and receiving an echo message for checking the aliveness of the communication apparatus 40, management of the sequence numbers of packets (i.e., the logical path 50), and the like.

Figure 3:
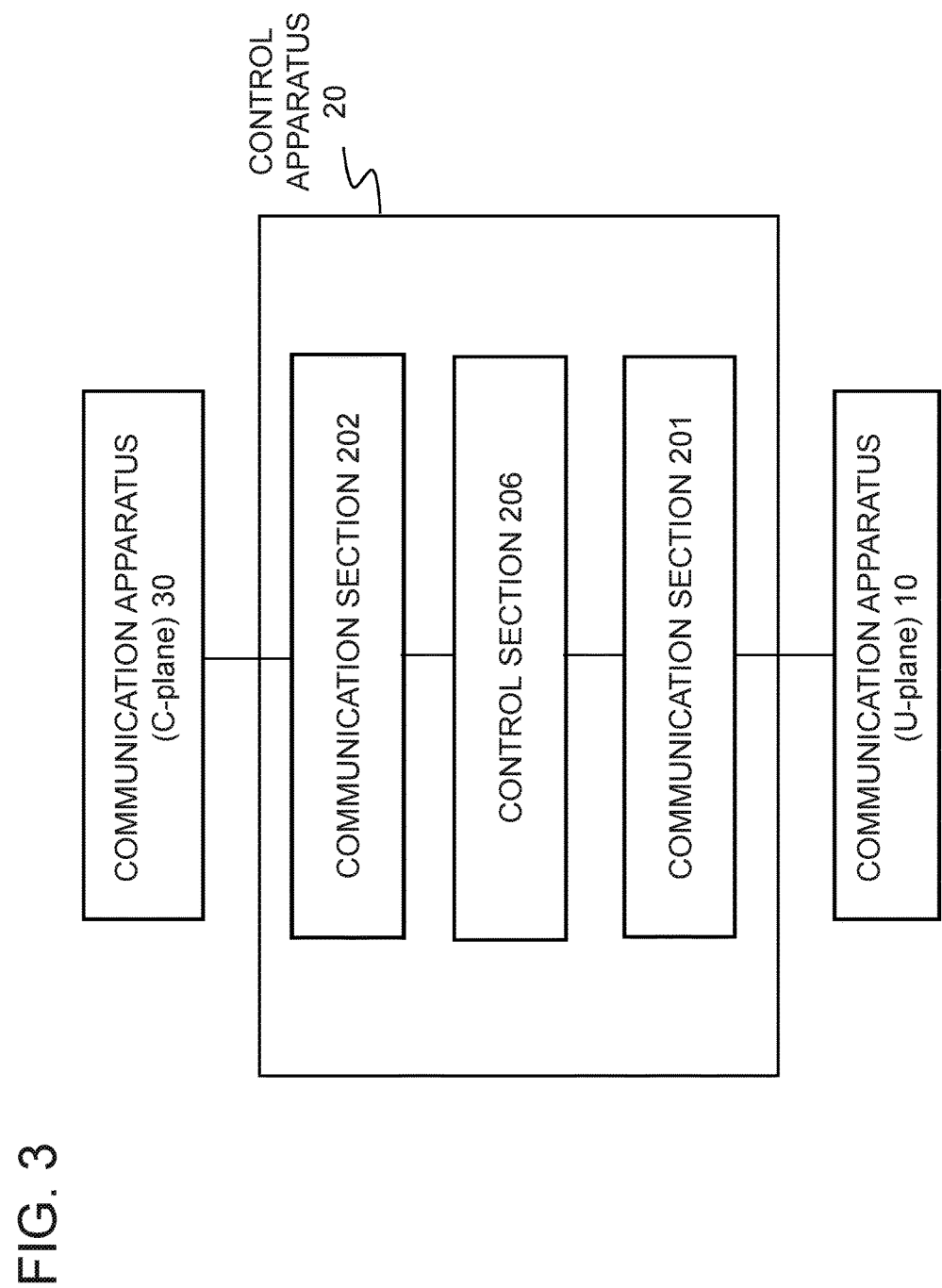
FIG. 3 is a block diagram showing a schematic configuration of a control apparatus according to the first exemplary embodiment of the present invention.

FIG. 3 shows an example of the configuration of the control apparatus 20. The control apparatus 20 includes communication sections 201 and 202 and a control section 206.

The communication section 202 receives a request to configure a U-plane logical path 50 from the communication apparatus 30 for C-plane.

The control section 206 selects a communication apparatus 10 to be caused to execute the U-plane processing function in response to the configure request received from the communication apparatus 30 for C-plane. The control section 206 sends a command including the identification information of the logical path 50 to be constructed in response to the request from the communication apparatus 30 for C-plane to the selected communication apparatus 10 via the communication section 201. For example, the control section 206 instructs the selected communication apparatus 10 to encapsulate a packet based on the received identification information and to decapsulate a packet corresponding to the identification information. Alternatively, if the logical path 50 is constructed in multiple stages in a cascaded manner, it is also possible to instruct to perform processing for modifying information included in the outer header.

1.2) Operations

Figure 4:
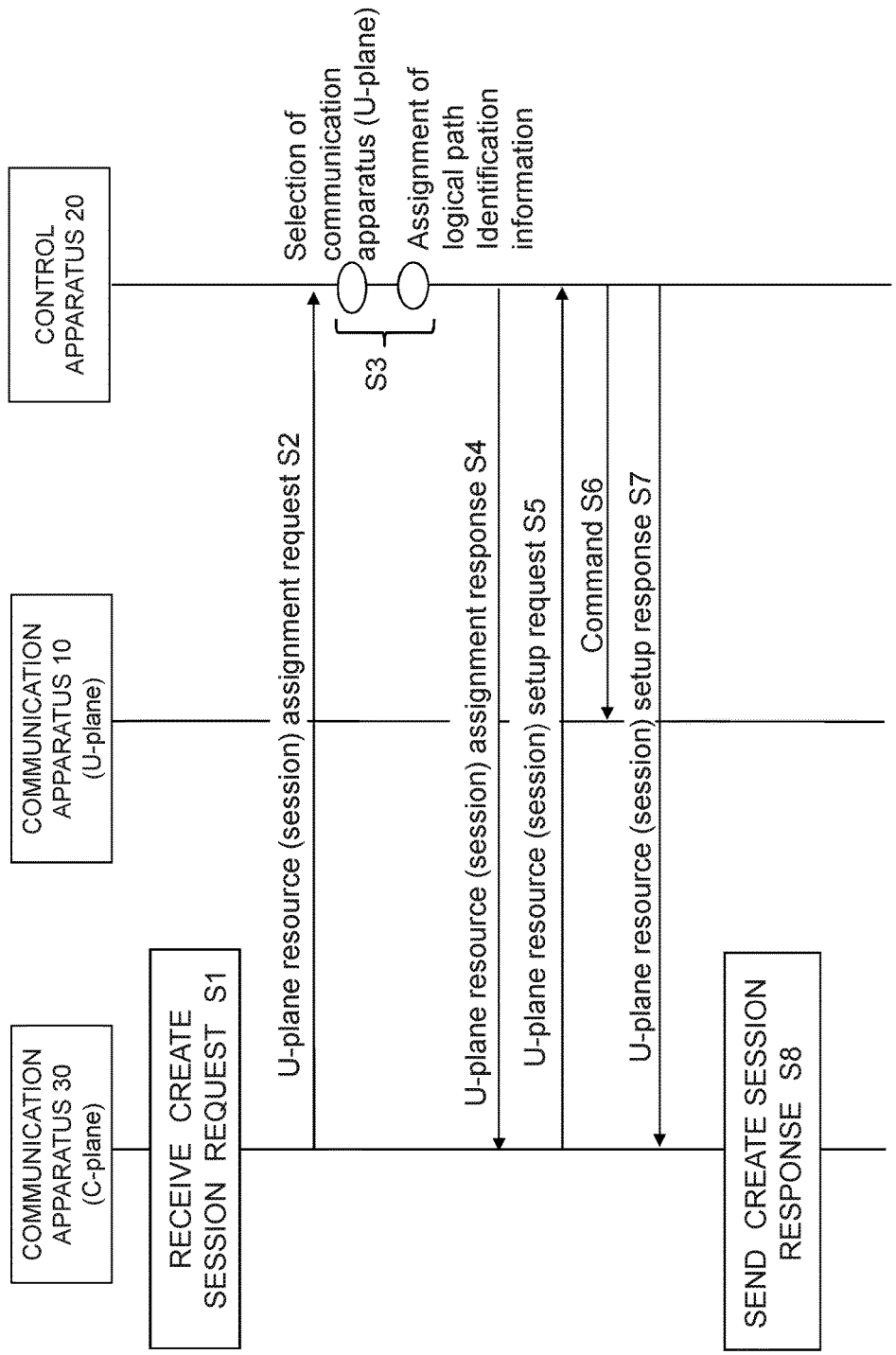
FIG. 4 is a sequence diagram showing operations in the communication system according to the first exemplary embodiment of the present invention.

FIG. 4 shows an example of operations in the first exemplary embodiment.

The communication apparatus 30 for C-plane receives a create session request from another apparatus (Operation S1). When receiving the create session request, the communication apparatus 30 for C-plane sends a setup request for U-plane logical path 50 to the control apparatus 20 (Operation S2).

The control apparatus 20, when receiving the setup request for logical path 50, performs selection of a communication apparatus 10 for U-plane and assignment of identification information (e.g., a TEID (Tunnel Endpoint ID)) to the logical path 50 to be set up by the selected communication apparatus 10 (Operation S3). The control apparatus 20 returns a U-plane resource (session) assignment response message to the communication apparatus 30 for C-plane (Operation S4). The communication apparatus 30 for C-plane having received the U-plane resource (session) assignment response message sends a U-plane resource (session) setup request message to the control apparatus 20 (Operation S5).

The control apparatus 20, when receiving the U-plane resource (session) setup request message, gives a command to encapsulate and decapsulate packets based on the identification information (Operation S6). The control apparatus 20 returns a U-plane resource (session) setup response message to the communication apparatus 30 for C-plane (Operation S7). The communication apparatus 30 for C-plane having received the U-plane resource (session) setup response message sends a create session response message to the other apparatus that has sent the create session request (Operation S8).

1.3) Effects

In the first exemplary embodiment of the present invention, an architecture is provided in which a communication apparatus having C-plane processing function and a communication apparatus having U-plane processing function are separated. A control apparatus dynamically controls the U-plane processing function in response to a request from the communication apparatus having C-plane processing function. Accordingly, according to the present exemplary embodiment, it is possible to flexibly increase/decrease the U-plane processing function.

2. Second Exemplary Embodiment

In a second exemplary embodiment of the present invention, the techniques mentioned in the above-described first exemplary embodiment can be applied. In the first exemplary embodiment, the control apparatus 20 controls the communication apparatus 10 by using a control protocol such as OpenFlow, I2RS, or ForCES and causes the communication apparatus 10 to execute the U-plane processing function.

On the other hand, according to the second exemplary embodiment, in a communication apparatus 10, the U-plane processing function is divided into a function to be executed in accordance with control by a control apparatus 20 and a function to be executed by the communication apparatus 10 itself. The communication apparatus 10 divides the U-plane processing function, whereby the control apparatus 20 can cause the communication apparatus 10 to execute the U-plane processing function more easily.

The communication apparatus 10 includes, in a separated manner, a function capable of performing logical path (e.g., bearer) termination processing, and a packet forward function that receives and sends packets via logical ports. The control apparatus 20 controls the packet forward function of the communication apparatus 10 so that a packet will be sent or received through an adequate logical path. Since management, such as configuration and deletion, of logical paths is performed by the logical path management function in the communication apparatus 10, the control apparatus 20 can increase/decrease the U-plane processing function more easily.

2.1) System Architecture

Figure 5:
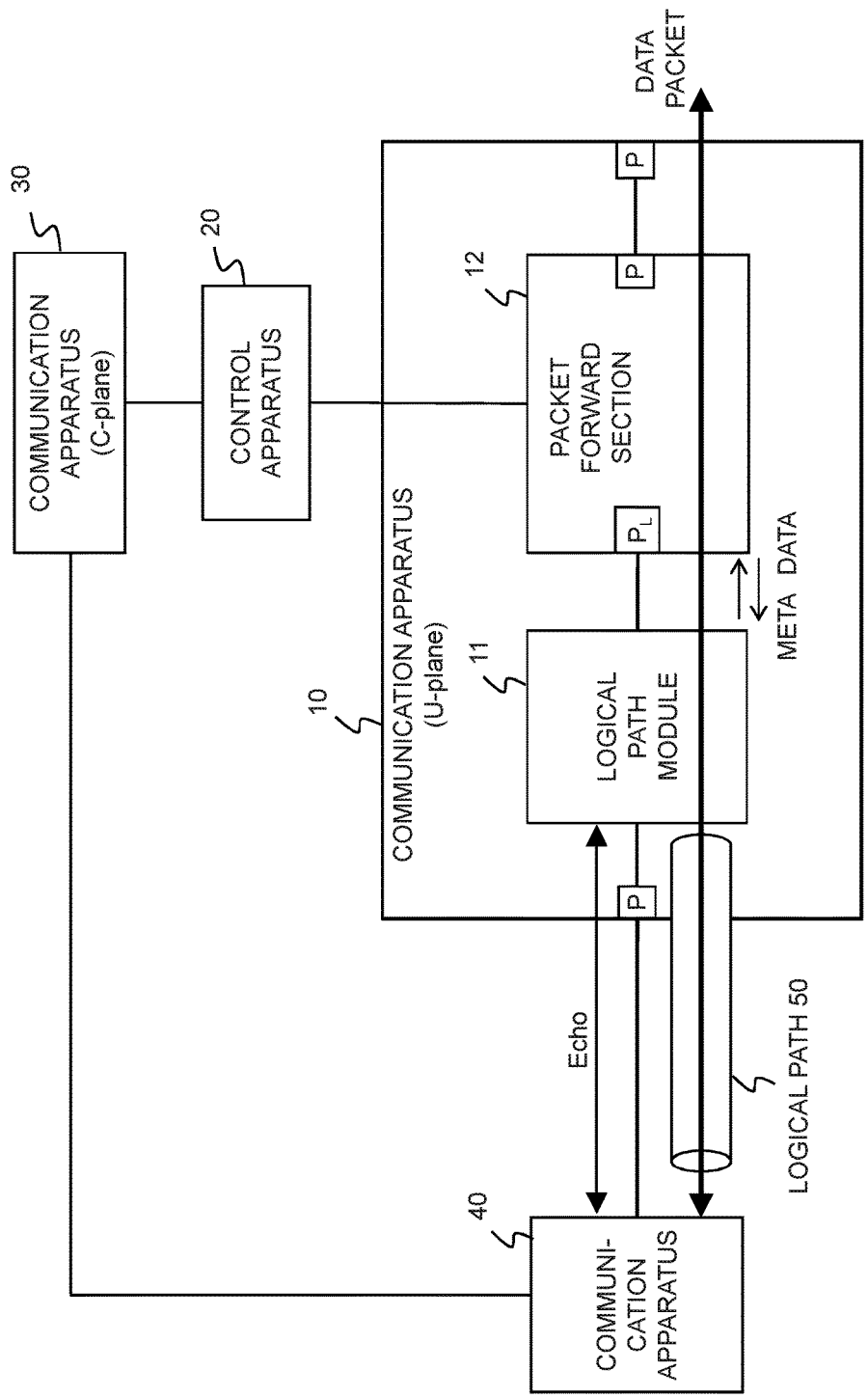
FIG. 5 is a schematic architecture diagram of a communication system according to a second exemplary embodiment of the present invention.

Referring to FIG. 5, a communication system according to the second exemplary embodiment of the present invention includes the communication apparatus 10 for U-plane that performs data traffic processing, the control apparatus 20, a communication apparatus 30 for C-plane, and a communication apparatus 40 that communicates with the communication apparatus 10, and it is assumed that a logical path 50 is created between the communication apparatus 10 for U-plane and the communication apparatus 40.

The communication apparatus 10 for U-plane includes a logical path module 11 that performs management, such as creation and deletion, of the logical path 50 and a packet forward section 12 that performs packet forwarding, which are provided in a functionally separated manner, and one logical path module 11 can be constructed for one logical port $P_L$ of the packet forward section 12. The logical path module 11 can perform processing for terminating the logical path 50. The number of logical ports $P_L$ of the packet forward section 12 is determined, for example, depending on an increase or a decrease in traffic. Moreover, for example, the number of logical ports $P_L$ is determined depending on the throughput of the communication apparatus 10 for U-plane. The packet forward section 12 has a function of performing processing on data packets in accordance with control information from the control apparatus 20, which will be described later. The packet forward section 12 can exchange information (e.g., the identification information of a bearer, or the like) related to the logical path termination processing to be performed by the logical path module 11, in accordance with an operation rule notified from the control apparatus 20. The logical path module 11 has a function of creating the logical path 50 with the other-end communication apparatus 40 and changing or releasing the logical path 50, as well as exchanging an echo message Echo to detect the state of the other-end communication apparatus 40.

The control apparatus 20 manages port information and packet forward rules of the communication apparatus 10 for U-plane and, in accordance with a command for data traffic forwarding received from the communication apparatus 30 for C-plane, sends control information for packet forwarding to the packet forward section 12 of the communication apparatus 10 for U-plane.

The communication apparatus 30 for C-plane has a function of bearer management, such as setup, modification, and release of a bearer at the communication apparatus 10 for U-plane, and gives a command to the control apparatus 20 about traffic forwarding at the packet forward section 12.

Note that another control apparatus may be used to implement a function of managing (such as creating and deleting) the logical path module 11, a function of associating the logical path module 11 with the logical port P$_L$ of the packet forward section 12, and the like.

<Communication Apparatus for U-Plane>

Figure 6:
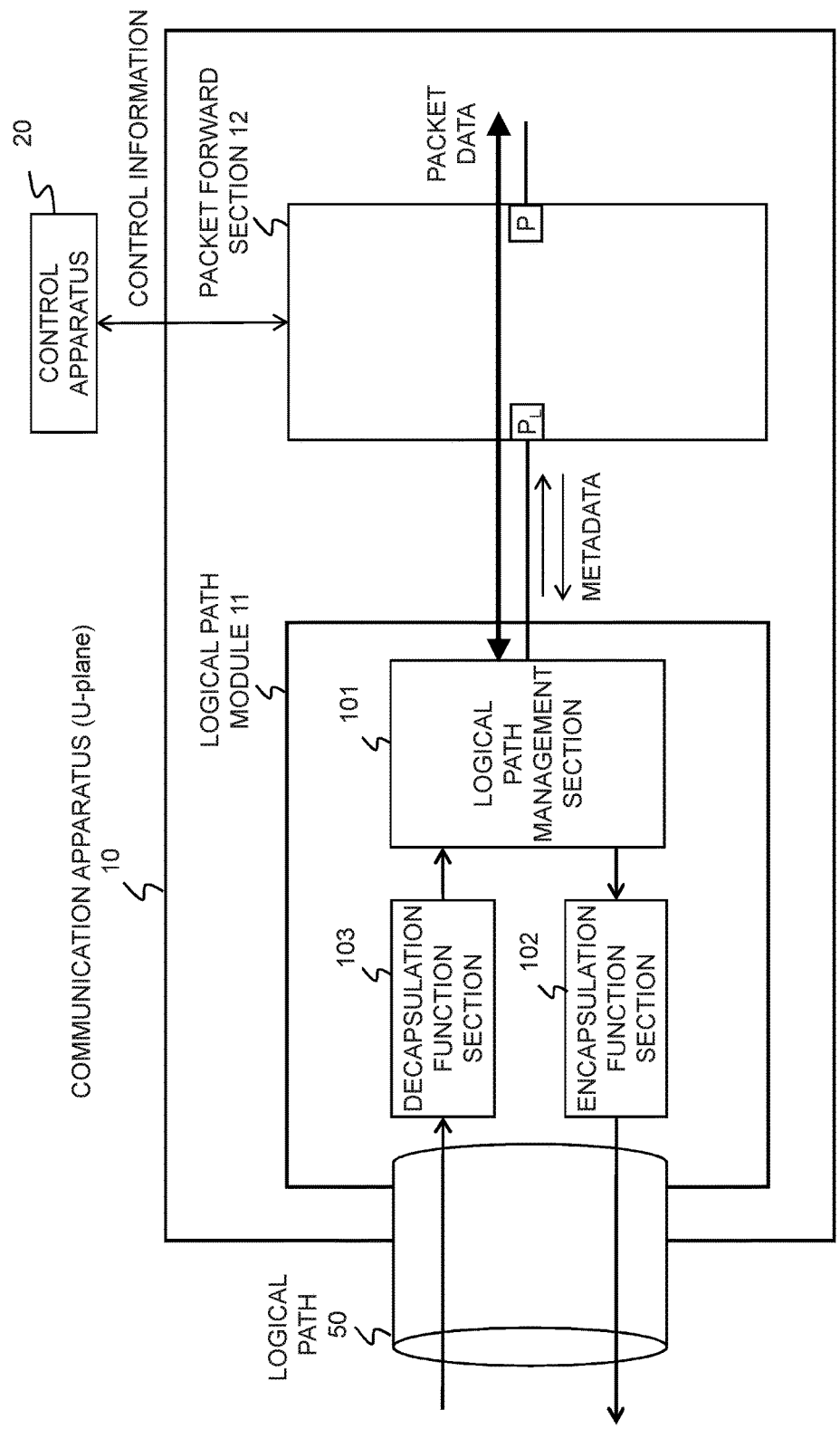
FIG. 6 is a block diagram showing a functional configuration of a communication apparatus according to the second exemplary embodiment of the present invention.

Referring to FIG. 6, the logical path module 11 includes a logical path management section 101 that manages the communication apparatus 40 on the other end of the logical path 50, and an encapsulation function section 102 and a decapsulation function section 103 for the logical path.

The logical path management section 101 performs processing for sending/receiving an echo message for checking the aliveness of the communication apparatus 40, packet sequence number management, and the like. The encapsulation function section 102 performs encapsulation based on a data packet input from the packet forward section 12 and metadata including identification information for identifying the logical path 50 and sends the resultant as a packet belonging to the logical path 50. Note that it is also possible to mark the header of a packet with QoS (Quality of Service) information at the time of encapsulation. The decapsulation function section 103, when receiving a packet belonging to the logical path 50, decapsulates the received packet and then outputs the decapsulated data packet to the packet forward section 12 and also outputs the identification information of the logical path 50 included in the outer header to the packet forward section 12 as metadata.

The packet forward section 12 performs packet forwarding in accordance with a packet forward rule from the control apparatus 20. The packet forward section 12, in accordance with the packet forward rule, can exchange information related to the logical path termination processing with the logical path module 11 concurrently with packet forwarding. Moreover, the packet forward section 12 manages the logical path module 11 as a logical port P$_L$ similarly to a physical port. That is, when a packet is received from the logical port P$_L$, the identification information of the logical path 50 to which this packet belongs is received as metadata along with the decapsulated data packet. Note that if a single logical path module can communicate with a plurality of other-end communication apparatuses as will be described later, the IP address of an other-end communication apparatus is also received together via the logical port P$_L$.

Reversely, when forwarding a packet to the logical port P$_L$, the packet forward section 12 transfers logical path identification information as metadata, along with the data packet, to the logical path module 11. If a single logical path module can communicate with a plurality of other-end communication apparatuses, the IP address of an other-end communication apparatus is also transfered via the logical port P$_L$.

<Control Apparatus>

Figure 7:
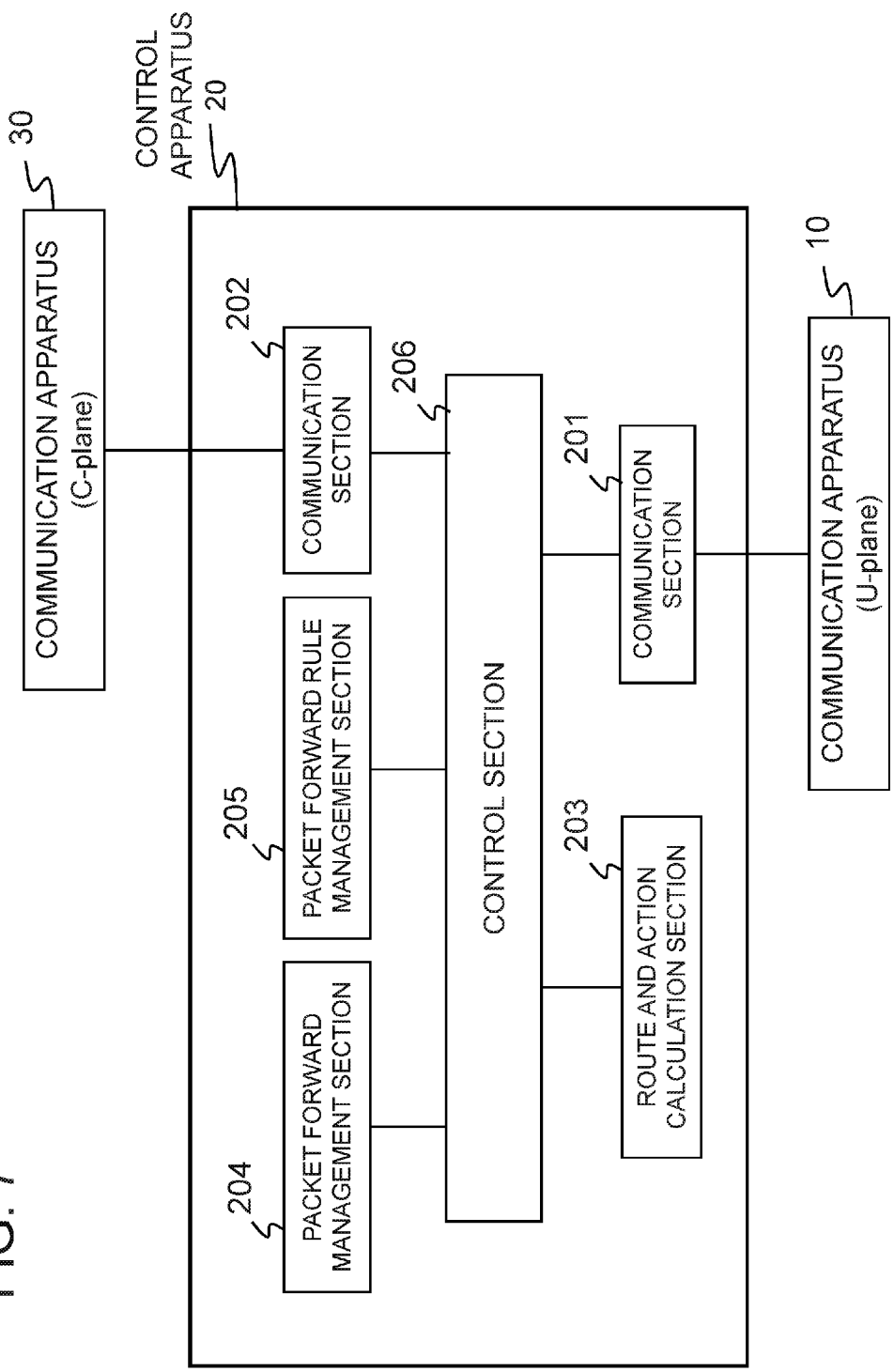
FIG. 7 is a block diagram showing a schematic configuration of a control apparatus according to the second exemplary embodiment of the present invention.

Referring to FIG. 7, the control apparatus 20 is interposed between the communication apparatus 30 for C-plane and the communication apparatus 10 for U-plane and sends a command for data traffic forwarding from the communication apparatus 30 for C-plane to the packet forward section 12 of the communication apparatus 10 for U-plane as a packet forward rule.

The control apparatus 20 includes a communication section 201 for communicating with the communication apparatus 10 for U-plane and a communication section 202 for communicating with the communication apparatus 30 for C-plane and further includes a route and action calculation section 203, a packet forward management section 204, a packet forward rule management section 205, and a control section 206.

The route and action calculation section 203 generates a packet forward rule based on information from the communication apparatus 30 for C-plane and sends it to the communication apparatus 10 for U-plane via the communication section 201. The packet forward rule for controlling the packet forward section 12 of the communication apparatus 10 for U-plane will be described later.

The packet forward management section 204 manages the capabilities and port information of the packet forward section 12 of the communication apparatus 10 for U-plane. Information on the logical port P$_L$ associated with the logical path 50 includes an IP address assigned to the logical path module 11. Note that in case where a single logical path module can communicate with a plurality of other-end communication apparatuses, the IP address of the other-end communication apparatus 40 is also included.

The packet forward rule management section 205 manages packet forward rules set in the packet forward section 12 of the communication apparatus 10 for U-plane and also manages subscriber-distinguishable information and bearer identification information.

Note that the control apparatus 20 may be provided with a function of managing communication apparatuses for U-plane. For example, it is possible to also perform management such as selection of a communication apparatus for U-plane, assignment or release of logical path identification information in units of the other-end communication apparatus for the logical path module in a communication apparatus for U-plane, management of bearer identification information, and the like and, together with this, management such as assignment and release of the IP address of UE may be also performed if the communication apparatus 10 is a P-GW. However, this function of managing communication apparatuses for U-plane may be provided to another apparatus such as the communication apparatus 30 for C-plane.

2.2) Operations

Hereinafter, processing for forwarding each packet belonging to a packet flow will be described with reference to FIG. 8.

Figure 8:
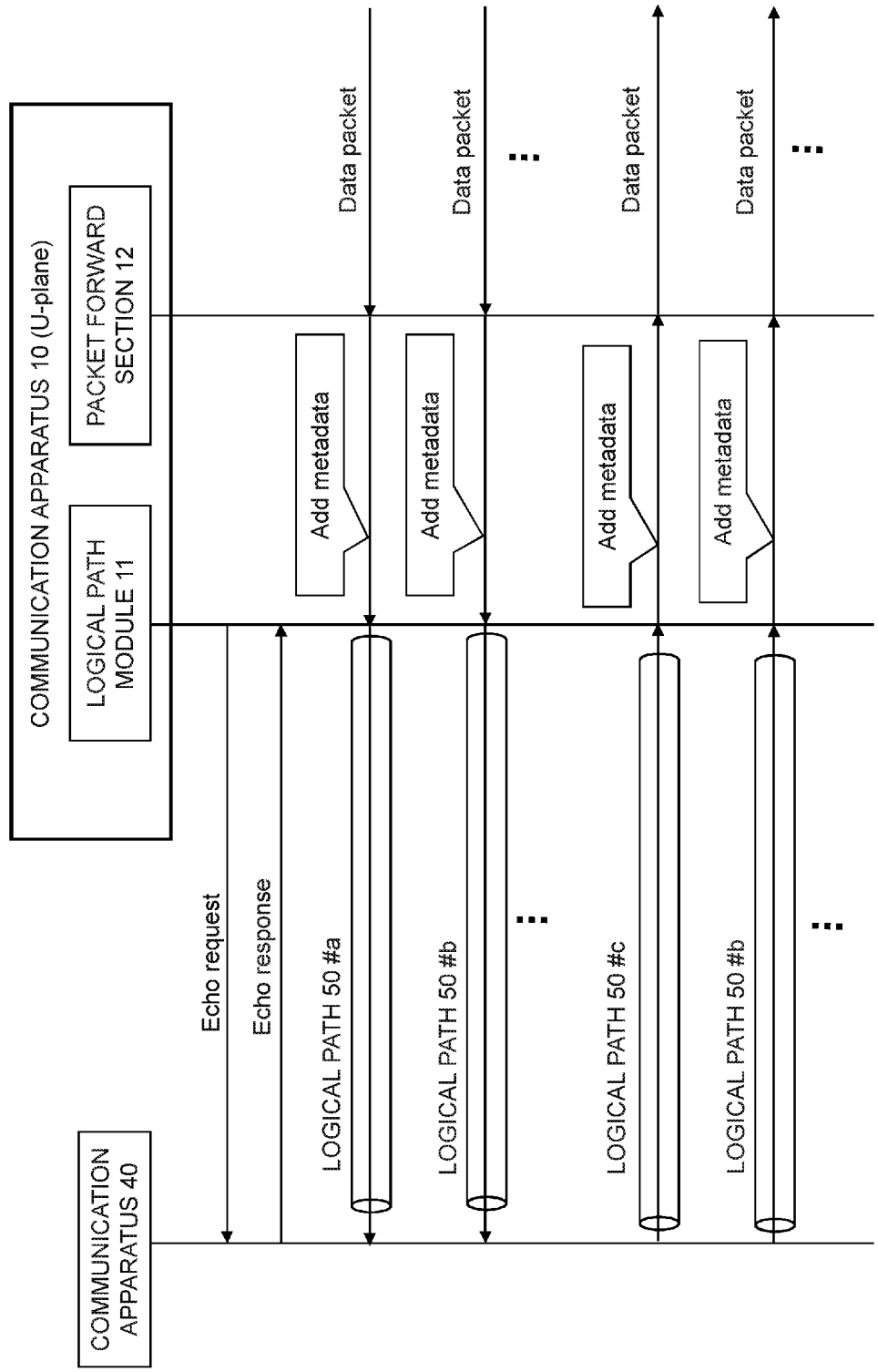
FIG. 8 is a sequence diagram showing operations in the communication system according to the second exemplary embodiment of the present invention.

Referring to FIG. 8, the logical path module 11 sends an echo request message to the other-end communication apparatus 40 and, depending on whether or not an echo response message responding to it is received, checks the aliveness of the other-end communication apparatus 40. Moreover, when an echo request message is received from the other-end communication apparatus 40, the logical path module 11 sends an echo response message responding to it.

The packet forward section 12, when receiving a data packet, checks its header information against a packet forward rule and, when determining that it is of a packet flow to be forwarded to the communication apparatus 40, forwards the packet to the logical path module 11 via the logical port P$_L$ with which the logical path 50 is set up. In this event, metadata including identification information for identifying the logical path 50 is transfered to the logical path module 11 along with the data packet. If a plurality of other-end communication apparatuses exist, the metadata also includes the IP address of an other-end communication apparatus to which the packet is to be sent.

The logical path module 11 performs encapsulation of the data packet based on the sequence number of the data packet and the metadata input from the packet forward section 12 and sends the resultant as a packet belonging to the logical path 50. Thereafter, in a similar manner, a data packet of the same flow is encapsulated and then sent each time it is received. Moreover, a sequence number is also added if a sequence number is used in the logical path.

The logical path module 11, when identifying the logical path 50 based on header information in an input data packet, decapsulates the data packet and outputs the decapsulated data packet to the packet forward section 12 and also outputs metadata including the identification information of the logical path 50 to the packet forward section 12. If there are a plurality of other-end communication apparatuses associated with the logical path module 11, the metadata also includes the IP address of an other-end communication apparatus from which the data packet is received. The packet forward section 12 checks the logical path identification information (and the IP address of the other-end communication apparatus) in the metadata against a packet forward rule, thereby identifying a port to which this data packet is to be forwarded, and then forwarding the data packet.

2.3) Effects

As described above, according to the second exemplary embodiment of the present invention, the control apparatus 20 registers a packet forward rule with the packet forward section 12 of the communication apparatus 10 for U-plane in accordance with a command for traffic forwarding from the communication apparatus 30 for C-plane, whereby the packet forward section 12 forwards a packet through the logical path associated with the other-end communication apparatus. Moreover, in the communication apparatus 10 for U-plane, the logical path module 11 executes the functions for echo processing for checking the state of the other-end communication apparatus, sequence number management, and the like, whereby it is possible to facilitate the management of a logical path in which a cut-and-paste operation frequently occurs, and it is also possible to reduce the processing load on a control system composed of the communication apparatus 30 for C-plane and the control apparatus 20.

2.4) Configuration Examples of Communication Apparatus for U-Plane

Hereinafter, specific examples of the configuration of the above-described communication apparatus 10 for U-plane will be described.

Figure 9:
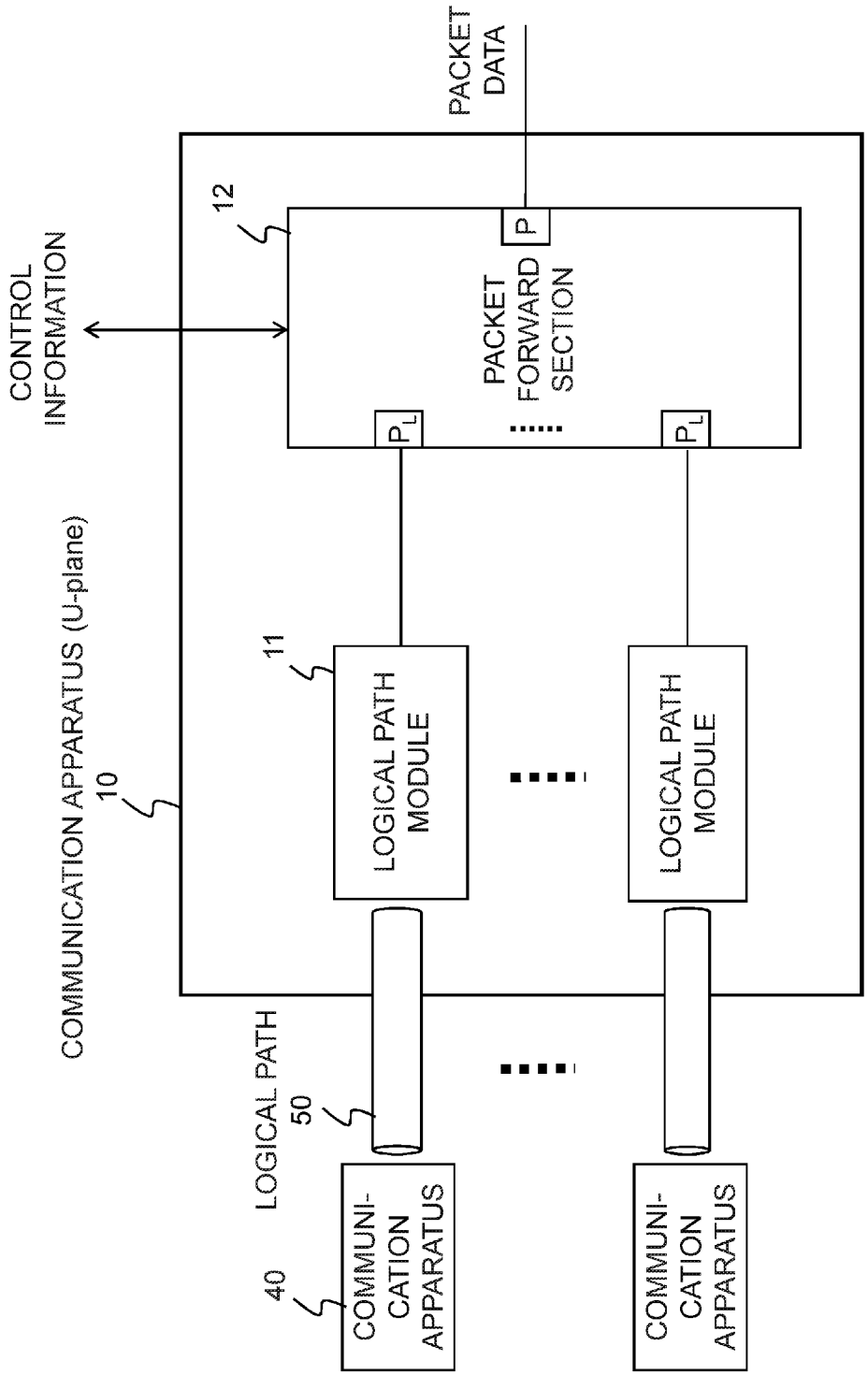
FIG. 9 is a block diagram showing a first example of the functional configuration of the communication apparatus according to the second exemplary embodiment of the present invention.

In an example shown in FIG. 9, the packet forward section 12 configures or releases a logical port $P_L$ depending on an increase or a decrease in traffic, and a logical path module 11 is constructed for each logical port $P_L$. One logical path 50 is set up for each logical path module 11. In this case, since each logical path module 11 is associated with an other-end communication apparatus 40 on a one-to-one basis, it is sufficient for the logical path module 11 and the packet forward section 12 to transfer metadata that includes identification information for identifying the relevant logical path 50.

Figure 10:
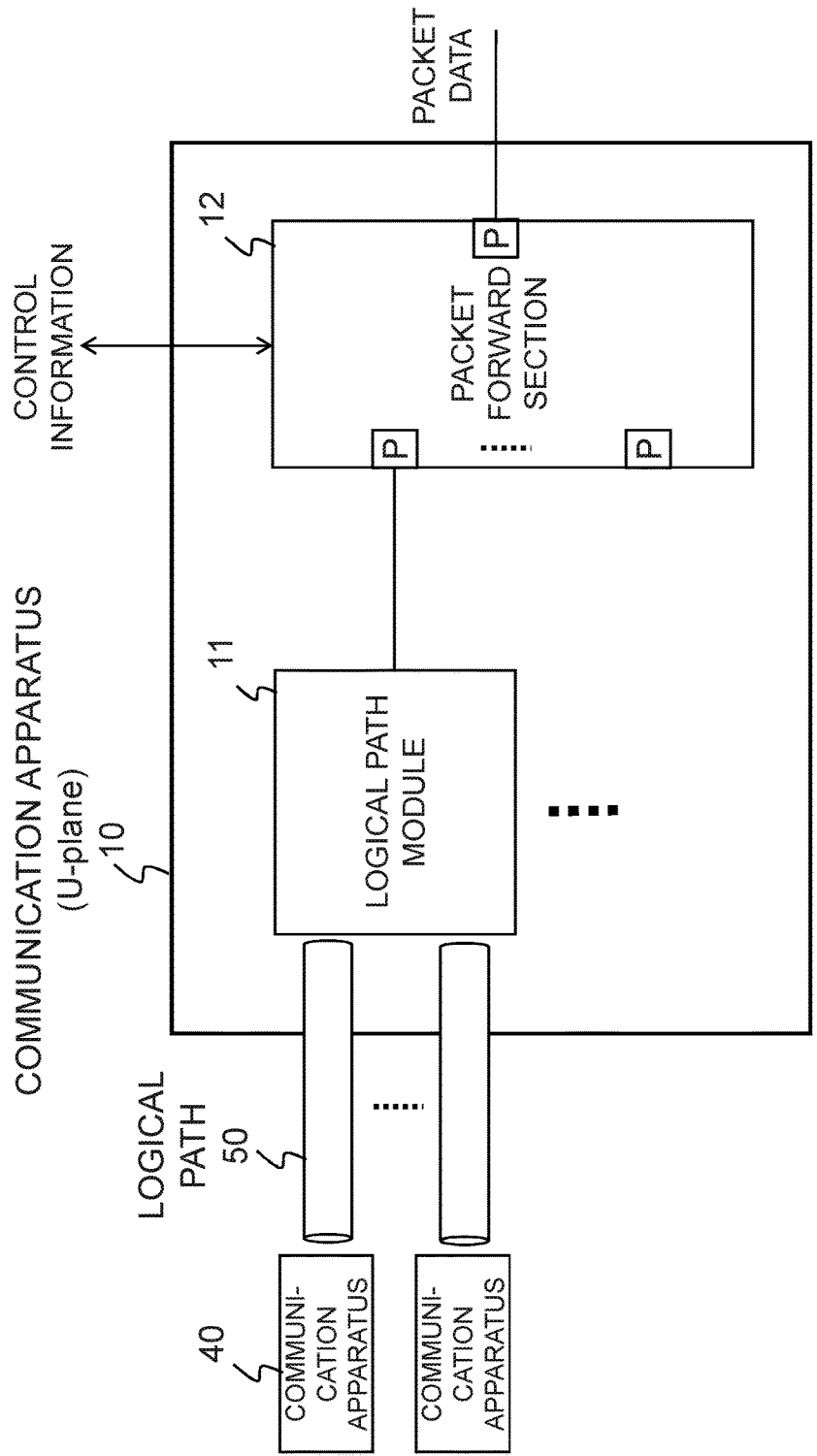
FIG. 10 is a block diagram showing a second example of the functional configuration of the communication apparatus according to the second exemplary embodiment of the present invention.

In an example shown in FIG. 10 as well, the packet forward section 12 configures or releases a logical port $P_L$ depending on an increase or a decrease in traffic, and a logical path module 11 is constructed for each logical port $P_L$. However, the difference is that a plurality of logical paths 50 are set up for each logical path module 11. In this case, since each logical path module 11 is associated with a plurality of other-end communication apparatuses, it is sufficient for the logical path module 11 and the packet forward section 12 to transfer metadata that includes the identification information of a logical path 50 and the IP address of each other-end communication apparatus.

Figure 11:
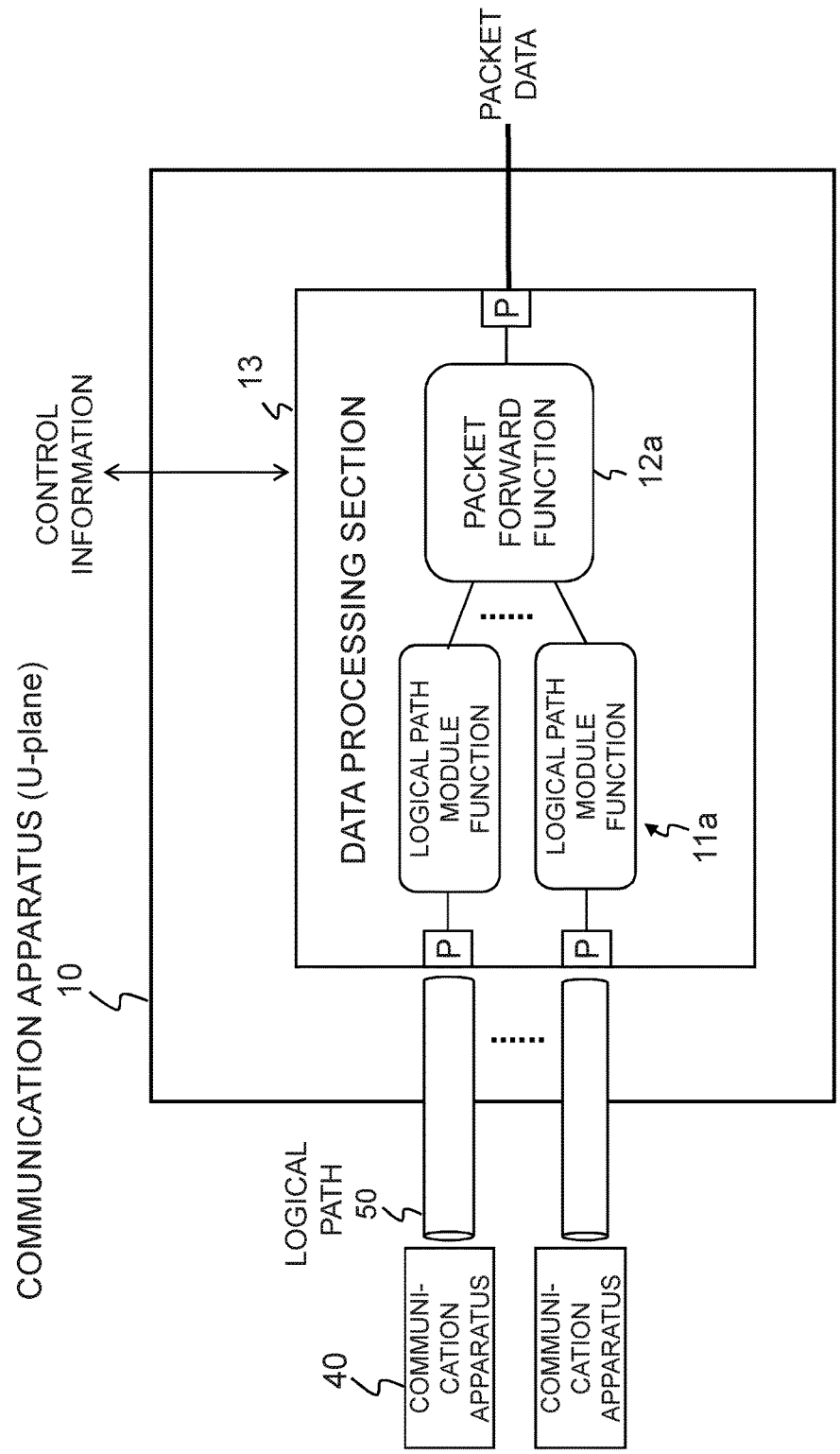
FIG. 11 is a block diagram showing a configuration of the communication apparatus implemented by using software, according to the second exemplary embodiment of the present invention.

In an example shown in FIG. 11, respective functions corresponding to the logical path module 11 and the packet forward section 12 are executed by software (a data processing section 13 in FIG. 11). The software includes logical path module functions 11a and a packet forward function 12a, and the logical path module function 11a corresponds to the logical path module 11 and the packet forward function 12a corresponds to the packet forward section 12. The software can add a required logical path module function 11a, for example, depending on user traffic. Note that if a single logical path module function 11a communicates with a plurality of other-end communication apparatuses, the functional configuration shown in FIG. 10 can also be implemented by using programs executed on the data processing section 13.

Not only is a logical path module 11 associated with a logical port $P_L$ created or deleted depending on an increase or a decrease in traffic as described above, but it is also possible that the states (such as loads and the numbers of logical ports) of communication apparatuses for U-plane 10 are monitored and a communication apparatus 10 for U-plane to terminate a new logical path is selected.

3. First Example 3.1) System Architecture

Figure 12:
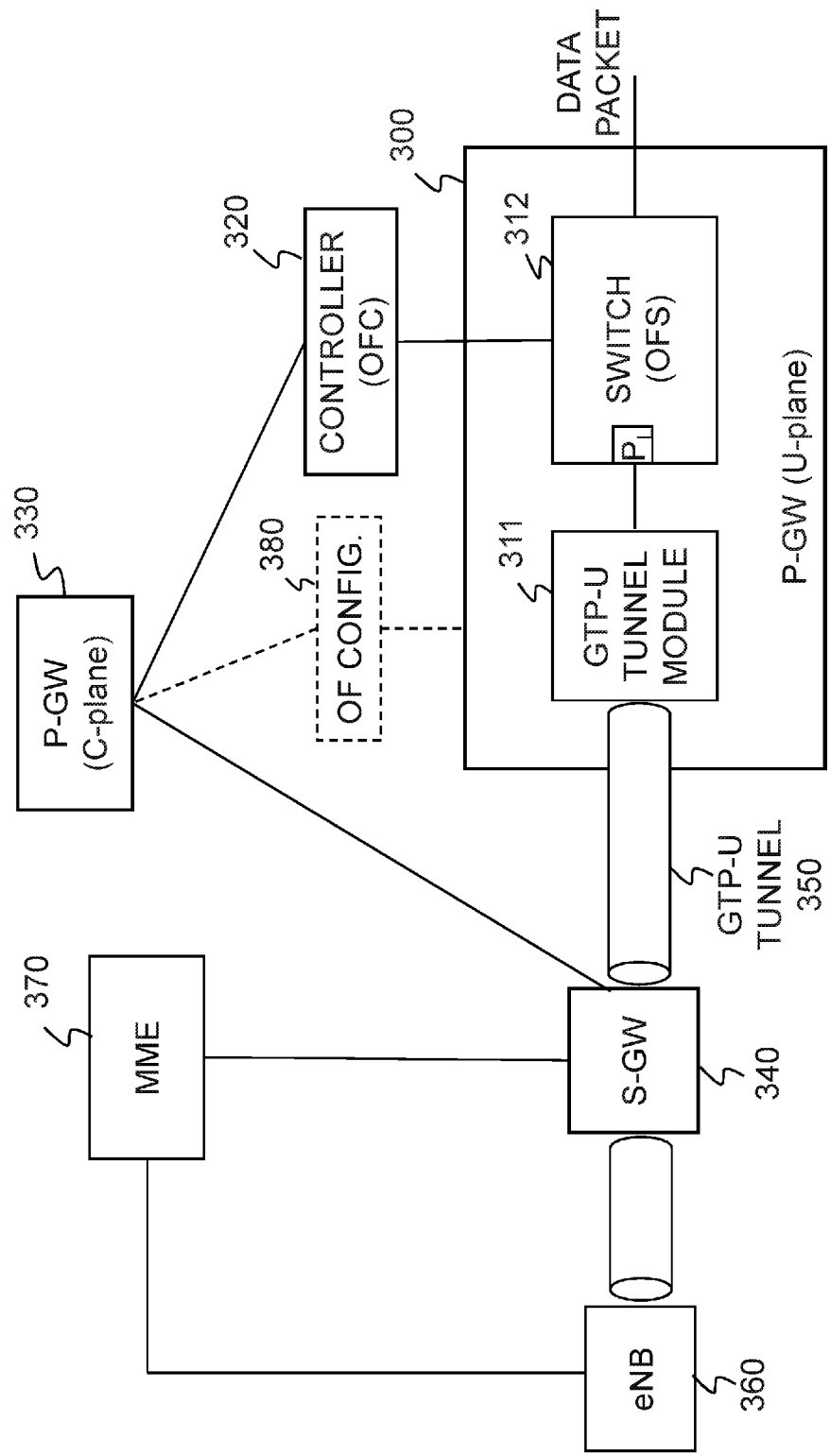
FIG. 12 is a system architecture diagram showing a functional architecture of a communication system according to a first example of the present invention.

Referring to FIG. 12, in a communication system according to a first example of the present invention, communication apparatuses for U-plane and for C-plane according to the first or second exemplary embodiment are applied to P-GWs for U-plane and for C-plane. In the present example, a GTP-U tunnel 350 is illustrated as the above-described logical path 50, and further, a U-plane P-GW 300, a controller 320, a C-plane P-GW 330, and a S-GW 340 are illustrated as the communication apparatus 10 for U-plane, control apparatus 20, communication apparatus 30 for C-plane, and other-end communication apparatus 40, respectively. Moreover, a radio base station eNB 360 is connected to the U-plane P-GW 300 through the GTP-U tunnel via the S-GW 340 that is selected by a mobility management entity (MME) 370.

The U-plane P-GW 300 is provided with a GTP-U tunnel module 311 and a switch 312, which correspond to the above-described logical path module 11 and packet forward section 12, respectively. The controller 320 has a function of identifying a packet flow, and registers a packet forward rule with the switch 312, thereby controlling the switch 312 so that the switch 312 will add metadata to a packet that matches the packet forward rule and will forward the packet via the GTP-U tunnel module 311, as described above. The GTP-U tunnel module 311 in the U-plane P-GW 300 creates the GTP-U tunnel 350 with the S-GW 340, which is an other-end communication apparatus, and performs encapsulation/decapsulation, alive monitoring on the other-end communication apparatus by using an echo message, sequence number management, and the like, as described above.

As described above, the switch 312 performs an action that matches a packet forward rule from the controller 320, thereby performing the above-described addition of metadata and packet forwarding. Such a network architecture system of centralized control type in which the controller 320 controls the switch 312 in a centralized manner can be implemented by using, for example, OpenFlow, I2RS (Interface to the Routing System), ForCES (Forwarding and Control Element Separation), or the like. Hereinafter, an example using OpenFlow will be described as an example of implementation of the controller 320 and switch 312.

3.2) OpenFlow

In OpenFlow, a communication is recognized as an end-to-end flow, and routing control, failure recovery, load balancing, and the like are performed in units of flow. Here, a flow is, for example, a group of communication packets in series that have a predetermined attribute. Hereinafter, a brief description will be given of OpenFlow, using a network shown in FIG. 13 as an example.

Figure 13:
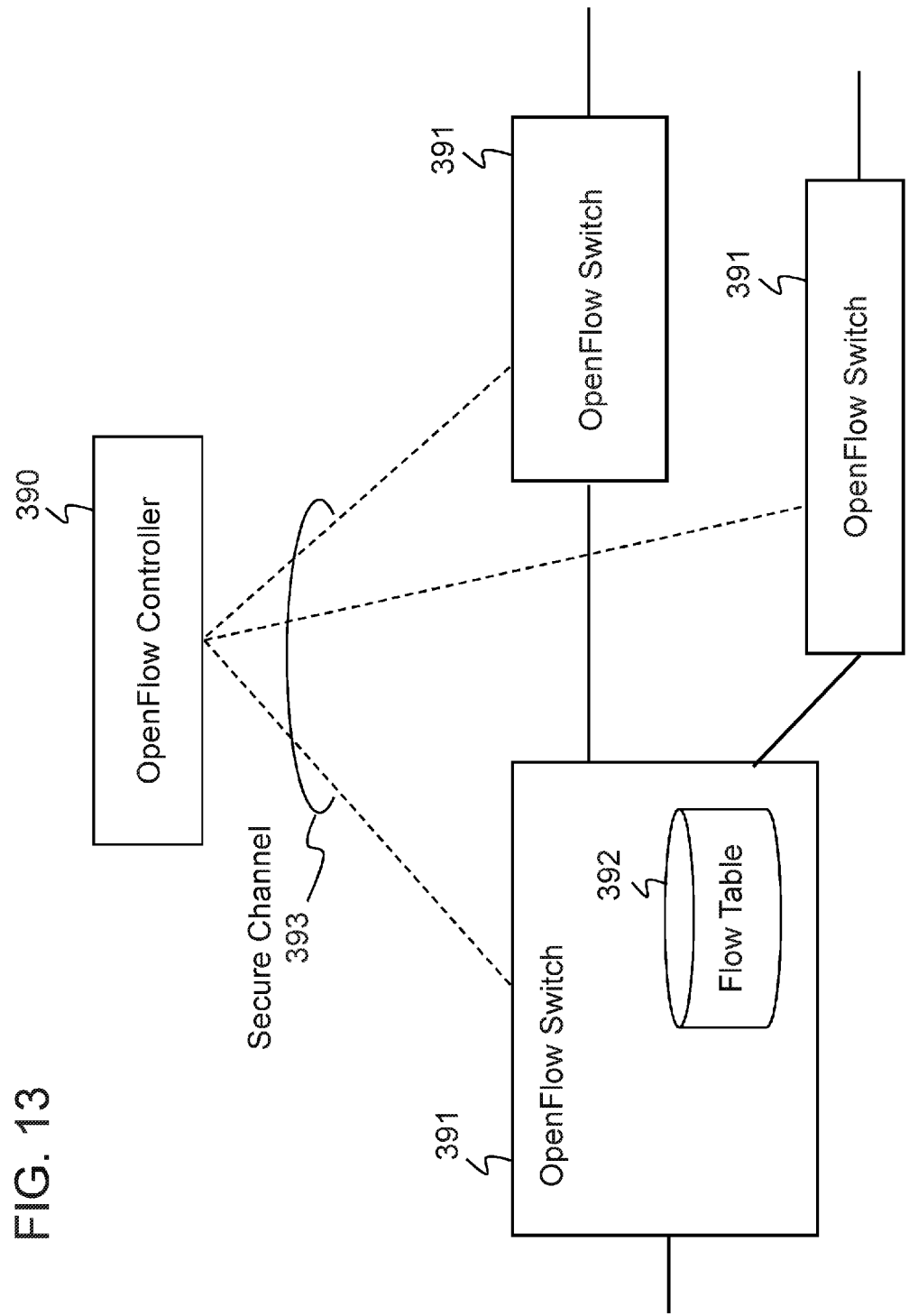
FIG. 13 is a schematic network diagram for describing the OpenFlow technology employed in the first example.

Referring to FIG. 13, OpenFlow Switches 391 are network switches employing the OpenFlow technology, and an OpenFlow Controller 390 is an information processing apparatus that controls the OpenFlow Switches 391.

A Secure Channel 393 is configured between each OpenFlow Switch 391 and the OpenFlow Controller 390, and each OpenFlow Switch 391 communicates with the OpenFlow Controller 391 through the Secure Channel 393. The OpenFlow Controller 390 makes settings on a Flow Table 392 of each OpenFlow Switch 391 through the Secure Channel 393. Note that the Secure Channels 393 are communication paths between the individual Switches 391 and the Controller 390 and are provided with measures for preventing eavesdropping, manipulation, and the like of communication.

Figure 14:
FIG. 14 is a format diagram schematically showing the structure of an entry stored in a flow table in FIG. 13.

FIG. 14 shows an example of the structure of each entry (flow entry) in the Flow Table 392. A flow entry includes Match Fields, which prescribe matching rules to be matched against information (e.g., destination IP address, VLAN ID, and the like) included in a header of a packet received by the Switch, a field (Counters) indicating statistical information on each packet flow, and an action field (Action), which prescribes packet processing methods that match the matching rules.

Each OpenFlow Switch 391, when receiving a packet, refers to the Flow Table 392. The OpenFlow Switch 391 searches for a flow entry that matches header information in the received packet. If an entry that matches the header information in the received packet is retrieved, the OpenFlow Switch 391 processes the received packet in accordance with a processing method prescribed in the action field of the retrieved entry. The processing method is, for example, processing for "forwarding the received packet from a predetermined logical port", "discarding the received packet", or "modifying part of a header of the received packet into metadata and forwarding the received packet to a predetermined logical port".

On the other hand, if no entry is found that matches the header information in the received packet, it is possible that, for example, the OpenFlow Switch 391 transfers the received packet to the OpenFlow Controller 390 through the Secure Channel 393 and requests the Controller 390 to set a flow entry that prescribes a method for processing the received packet.

The OpenFlow Controller 390 determines a method for processing the received packet and registers a flow entry including the determined processing method in the Flow Table 392. Thereafter, the OpenFlow Switch 391 processes subsequent packets belonging to the same flow as the received packet, based on the registered flow entry.

The switch 312 and controller 320 in the communication system according to the first example of the present invention include functions corresponding to the above-described OpenFlow Switch 391 and OpenFlow Controller 390. That is, the functions of the OpenFlow Switch 391 are implemented on the switch 312 in FIG. 12, and the functions of the OpenFlow Controller 390 are implemented on the controller 320 in FIG. 12. The Flow Table 392 in the OpenFlow Switch 391 corresponds to a storage section (not shown) provided within the switch 312 of FIG. 12. Hereinafter, an architecture of a mobile system and operations therein will be described as an example of application of the present example in which OpenFlow is implemented.

3.3) Application Example

Figure 15:
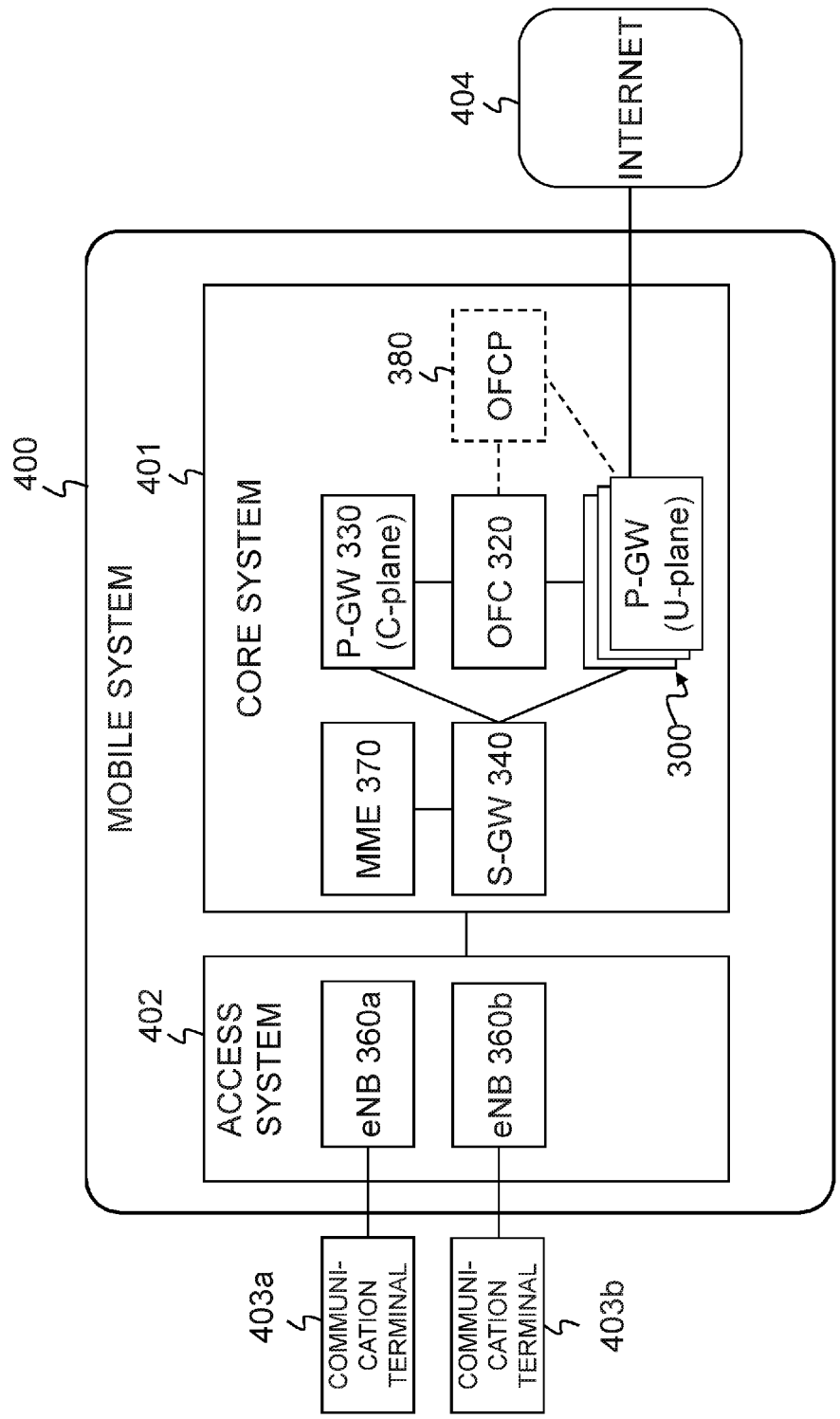
FIG. 15 is a system architecture showing an example of the functional architecture of the communication system according to the first example.

Referring to FIG. 15, a mobile system 400 includes a core system 401 and an access system 402, wherein the core system 401 includes U-plane P-GWs 300, a controller (OFC) 320, a C-plane P-GW 330, a S-GW 340, and a MME 370 as shown in FIG. 12. Note that processing for creation, modification, release, or the like of a GTP-U tunnel at the U-plane P-GW 300 is performed by an OpenFlow configuration function (OFCP: OpenFlow Configuration Point) in general. However, in the present example, it can be performed by the OFC 320.

The access system 402 includes radio base stations, eNBs 360a and 360b, wherein it is assumed here that communication terminals 403a and 403b are connected to the radio base stations, respectively. The access system 402 is a radio access network that provides the communication terminals 403 with connectivity to the mobile system 400, for example, by using a radio access scheme of LTE. The communication terminals 403 are mobile stations such as user terminal UE, mobile telephone, mobile communication terminal, and the like. The communication terminals 403 can connect to an Internet 404, which is an external network, via the mobile system 400.

3.3.1) Default Bearer Construction at P-GW

Figure 16:
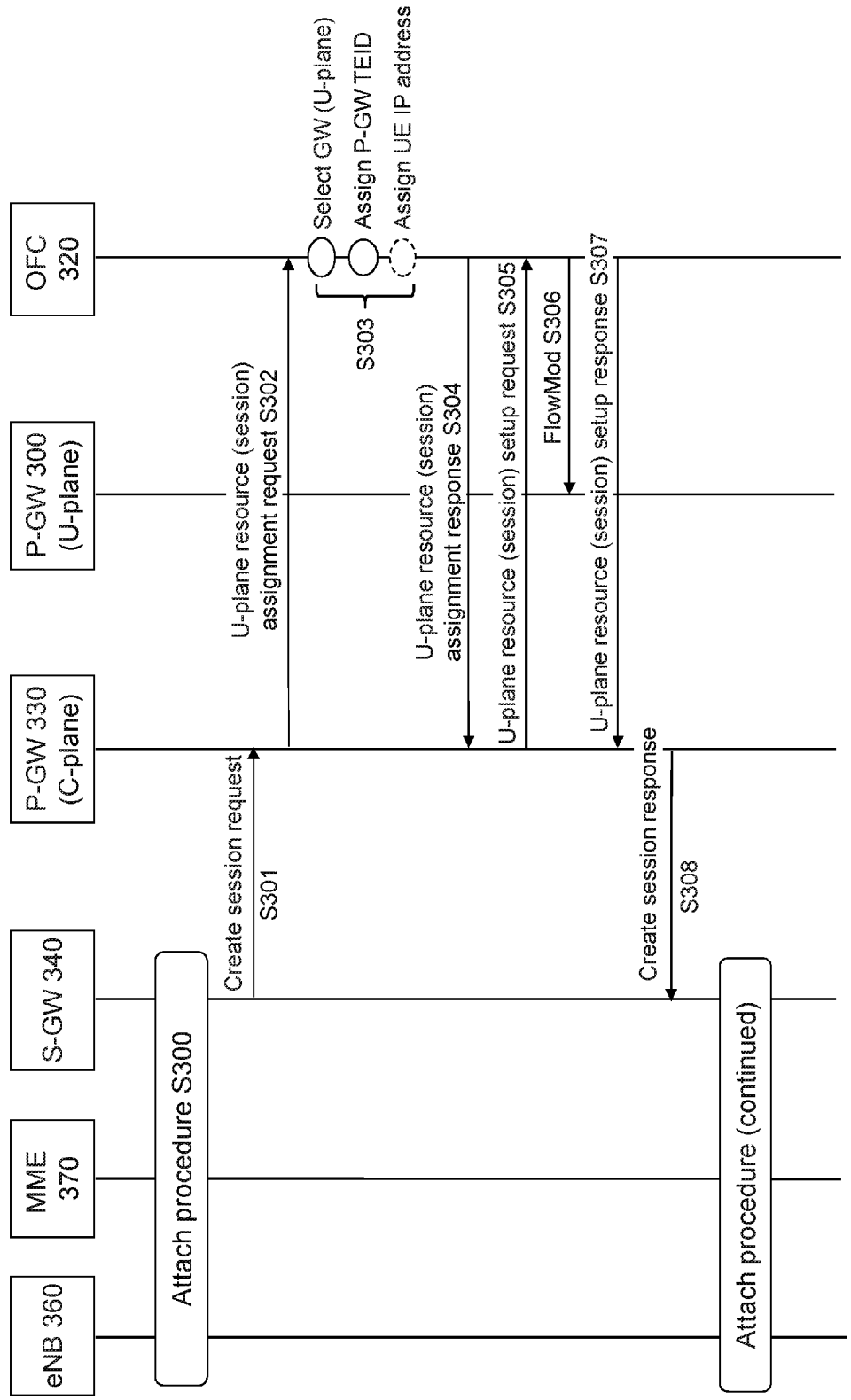
FIG. 16 is a sequence diagram showing an example of a procedure for default bearer construction at P-GW in the communication system shown in FIG. 15.

Referring to FIG. 16, when an attach procedure is started by the eNB 360, MME 370, and S-GW 340 (Operation S300), the S-GW 340 sends a create session request message to the C-plane P-GW 330 (Operation S301). The C-plane P-GW 330, when receiving the create session request message, sends a U-plane resource (session) assignment request message to the OFC 320 (Operation S302).

The OFC 320, when receiving the U-plane resource (session) assignment request message, performs selection of a U-plane P-GW, assignment of GTP-U tunnel identification information (TEID) for the selected P-GW, and, if necessary, assignment of a communication terminal's IP address (Operation S303), and returns a U-plane resource (session) assignment response message to the C-plane P-GW 330 (Operation S304). The C-plane P-GW 330 having received the U-plane resource (session) assignment response message sends a U-plane resource (session) setup request message to the OFC 320 (Operation S305).

The OFC 320, when receiving the U-plane resource (session) setup request message, generates a flow modification (FlowMod) message, which will be described next, and sends it to the U-plane P-GW 300 (Operation S306) and further returns a U-plane resource (session) setup response message to the C-plane P-GW 330 (Operation S307). The C-plane P-GW 330 having received the U-plane resource (session) setup response message sends a create session response message to the S-GW 340 (Operation S308), and the above-described attach procedure is performed continuously.

The U-plane P-GW 300 registers flow modification information in the received FlowMod message with the switch 312 as a packet forward rule, whereby prescribed processing is performed on the packets of a target flow. The FlowMod message has the format shown in FIG. 14 and, here, has a structure as follows.

<FlowMod Structure>

With respect to an uplink packet,
Matching field:
   The packet input port is a logical port $P_L$ associated with a relevant GTP-U tunnel module 11;
   (S-GW address and) S-GW TEID and P-GW TEID as metadata make exact matches; and
   The rest are all wildcards.

Action:
  Modify the destination MAC address to that of a corresponding node (e.g., a router or the like existing at a higher tier);
  Modify the source MAC address to that of the P-GW 300; and
  Forward to a port toward the Internet.
With respect to a downlink packet,
Matching field:
  UE IP address exactly matches the destination IP address; and
  The rest are all wildcards.
Action:
  Add (S-GW address and) S-GW TEID and P-GW TEID as metadata; and
  Forward to a logical port $P_L$ associated with a relevant GTP-U tunnel module 11.

3.3.2) Default Bearer Release at P-GW

Figure 17:
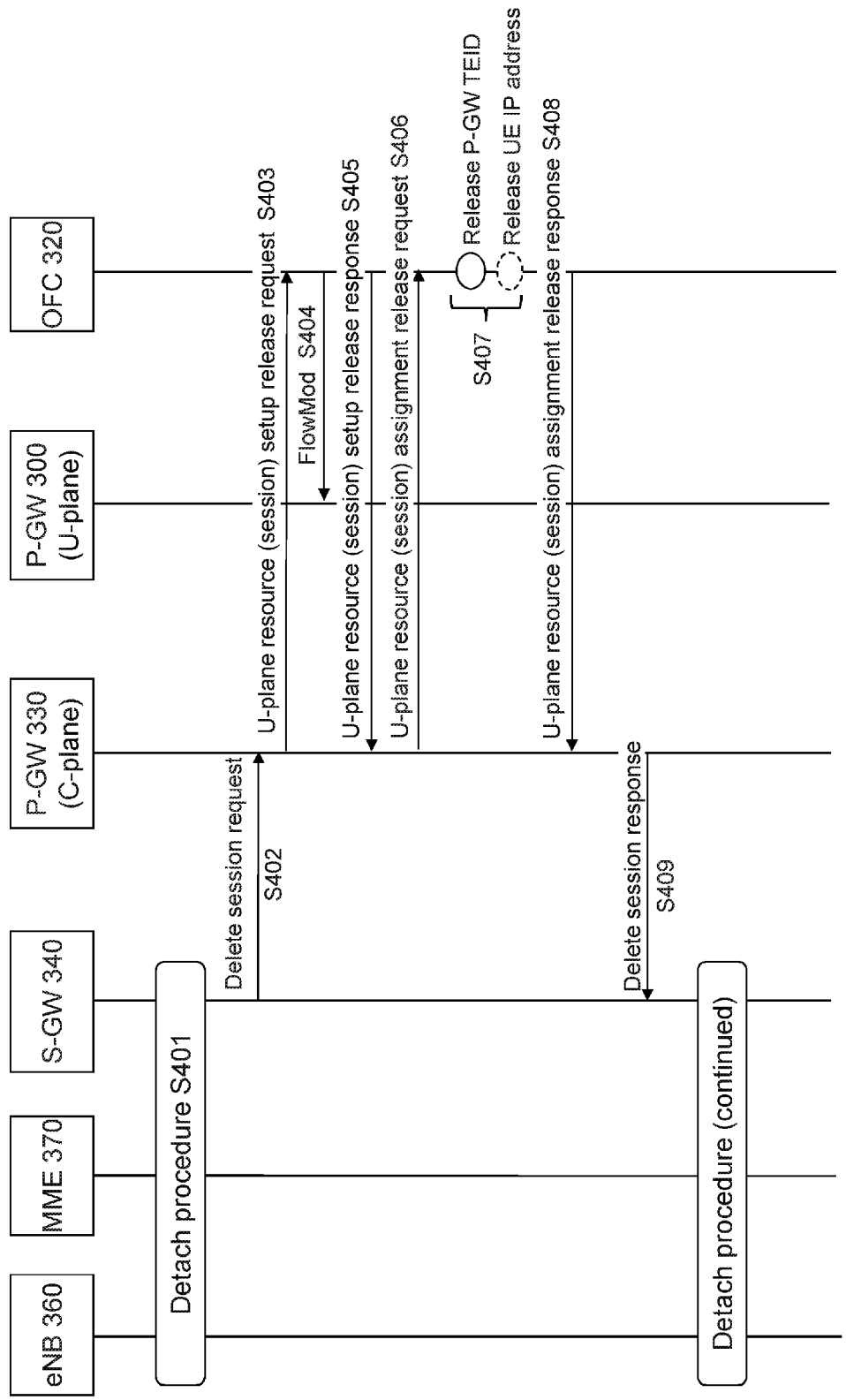
FIG. 17 is a sequence diagram showing an example of a procedure for default bearer release at P-GW in the communication system shown in FIG. 15.

Referring to FIG. 17, when a detach procedure is started by the eNB 360, MME 370, and S-GW 340 (Operation S401), the S-GW 340 sends a delete session request message to the C-plane P-GW 330 (Operation S402). The C-plane P-GW 330, when receiving the delete session request message, sends a U-plane resource (session) setup release request message to the OFC 320 (Operation S403).

The OFC 320, when receiving the U-plane resource (session) setup release request message, generates a FlowMod message and sends it to the U-plane P-GW 300 (Operation S404) and further returns a U-plane resource (session) setup release response message to the C-plane P-GW 330 (Operation S405). The C-plane P-GW 330 having received the U-plane resource (session) setup release response message sends a U-plane resource (session) assignment release request message to the OFC 320 (Operation S406).

The OFC 320, when receiving the U-plane resource (session) assignment release request message, releases the TEID of the U-plane P-GW and, if necessary, also releases the IP address of the communication terminal (Operation S407). Subsequently, the OFC 320 sends a U-plane resource (session) assignment release response message to the C-plane P-GW 330 (Operation S408). The C-plane P-GW 330 sends a delete session response message to the S-GW 340 (Operation S409), and the above-described detach procedure is performed continuously.

The U-plane P-GW 300 releases a packet forward rule in accordance with flow modification information in the received FlowMod message. The FlowMod in this case instructs to perform deletion, using the same matching rules that are used in the above-described bearer construction.

3.3.3) Dedicated Bearer Construction at P-GW

Figure 18:
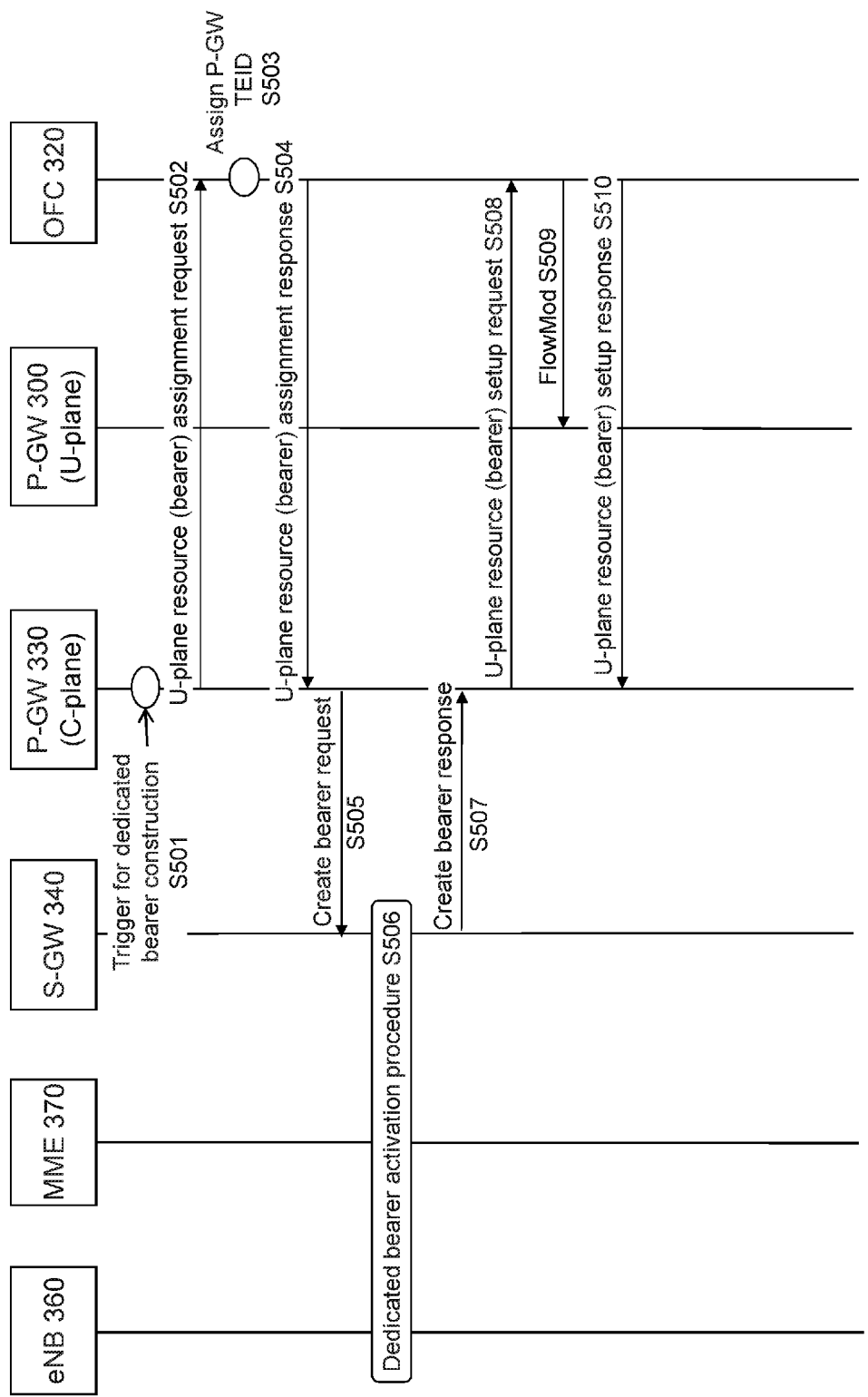
FIG. 18 is a sequence diagram showing an example of a procedure for dedicated bearer construction at P-GW in the communication system shown in FIG. 15.

Referring to FIG. 18, the C-plane P-GW 330, when detecting a trigger for dedicated bearer construction (Operation S501), sends a U-plane resource (bearer) assignment request message to the OFC 320 (Operation S502).

The OFC 320, when receiving the U-plane resource (bearer) assignment request message, assigns a TEID for a U-plane P-GW (Operation S503) and returns a U-plane resource (bearer) assignment response message to the C-plane P-GW 330 (Operation S504). The C-plane P-GW 330 having received the U-plane resource (bearer) assignment response message sends a create bearer request message to the S-GW 340 (Operation S505), and a dedicated bearer activation procedure is performed by the eNB 360, MME 370, and S-GW 340 (Operation S506). Subsequently, the S-GW 340 sends a create bearer response message to the C-plane P-GW 330 (Operation S507), and the C-plane P-GW 330, when receiving this, sends a U-plane resource (bearer) setup request message to the OFC 320 (Operation S508).

The OFC 320, when receiving the U-plane resource (bearer) setup request message, generates a flow modification (FlowMod) message, which will be described next, and sends it to the U-plane P-GW 300 (Operation S509) and further returns a U-plane resource (bearer) setup response message to the C-plane P-GW 330 (Operation S510).

The U-plane P-GW 300 registers flow modification information in the FlowMod message with the switch 312 as a packet forward rule, and the switch 312 performs prescribed processing on the packets of a target flow in accordance with this rule. The FlowMod message has the format shown in FIG. 14 and, here, has a structure as follows.

<FlowMod Structure>
With respect to an uplink packet,
Matching field:
  The packet input port is a logical port $P_L$ associated with a relevant GTP tunnel module 11;
  (S-GW address and) S-GW TEID and P-GW TEID as metadata make exact matches; and
  The rest are all wildcards.
Action:
  Forward to a port toward the Internet.
With respect to a downlink packet,
Matching field:
  Exact matches occur in a field designated by TFT (Traffic Flow Template); and
  The rest are all wildcards.
Action:
  Add (S-GW address and) S-GW TEID and P-GW TEID as metadata; and
  Forward to a logical port $P_L$ associated with a relevant GTP tunnel module 11.

3.3.4) Dedicated Bearer release at P-GW

Figure 19:
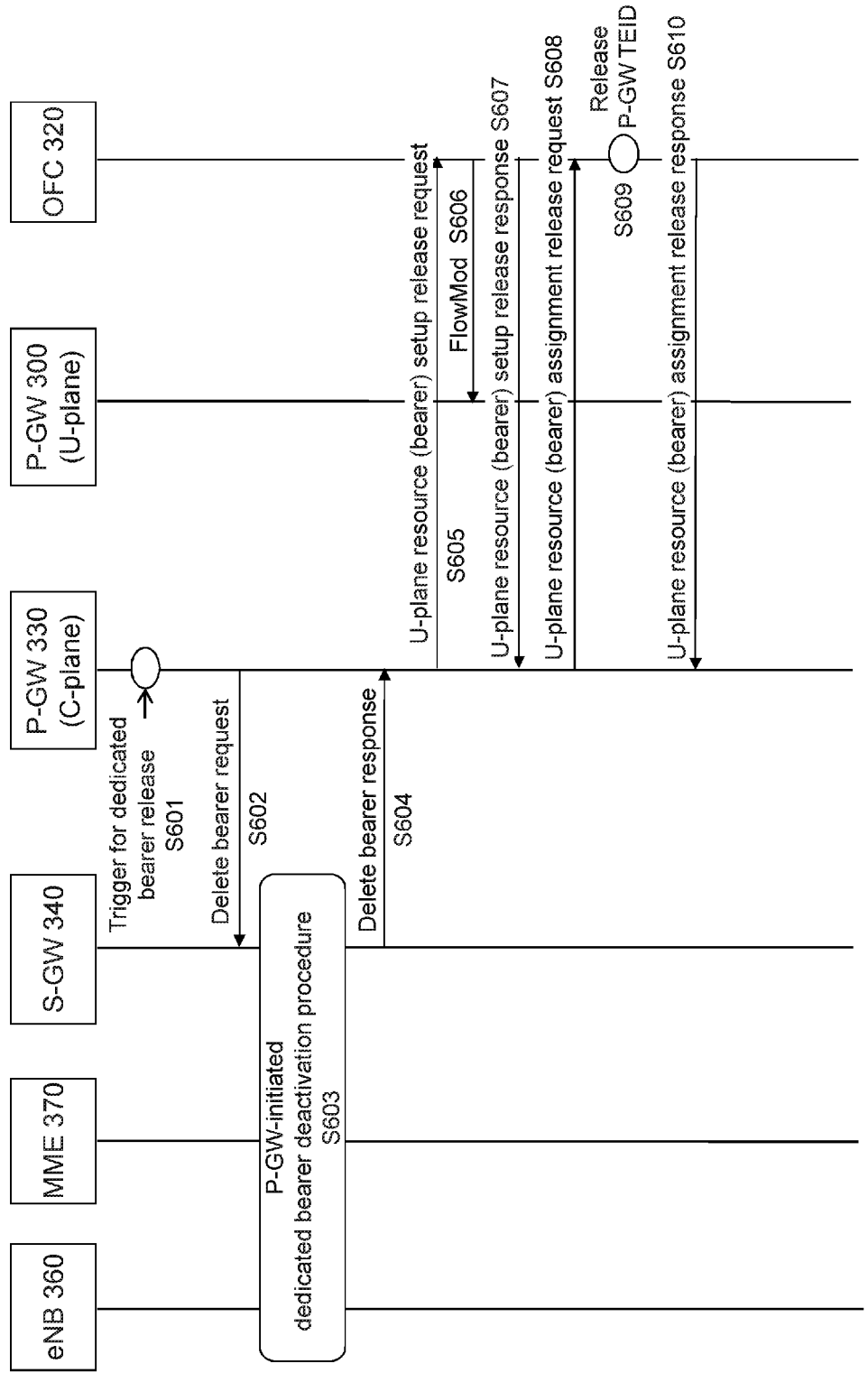
FIG. 19 is a sequence diagram showing an example of a procedure for dedicated bearer release at P-GW in the communication system shown in FIG. 15.

Referring to FIG. 19, the C-plane P-GW 330, when detecting a trigger for dedicated bearer release (Operation S601), sends a delete bearer request message to the S-GW 340 (Operation S602), whereby the eNB 360, MME 370, and S-GW 340 performs a dedicated bearer deactivation procedure (Operation S603). Subsequently, the S-GW 340 sends a delete bearer response message to the C-plane P-GW 330 (Operation S604), and the C-plane P-GW 330, when receiving this, sends a U-plane resource (bearer) setup release request message to the OFC 320 (Operation S605).

The OFC 320, when receiving the U-plane resource (bearer) setup release request message, generates a FlowMod message and sends it to the U-plane P-GW 300 (Operation S606) and further returns a U-plane resource (bearer) setup release response message to the C-plane P-GW 330 (Operation S607). The C-plane P-GW 330 having received the U-plane resource (bearer) setup release response message sends a U-plane resource (bearer) assignment release request message to the OFC 320 (Operation S608).

The OFC 320, when receiving the U-plane resource (bearer) assignment release request message, releases the TEID of the U-plane P-GW (Operation S609). Subsequently, the OFC 320 sends a U-plane resource (bearer) assignment release response message to the C-plane P-GW 330 (Operation S610).

The U-plane P-GW 300 releases a packet forward rule in accordance with flow modification information in the received FlowMod message. The FlowMod in this case insructs to perform deletion, using the same matching rules that are used in the above-described bearer construction.

4. Second Example
4.1) System Architecture

Figure 20:
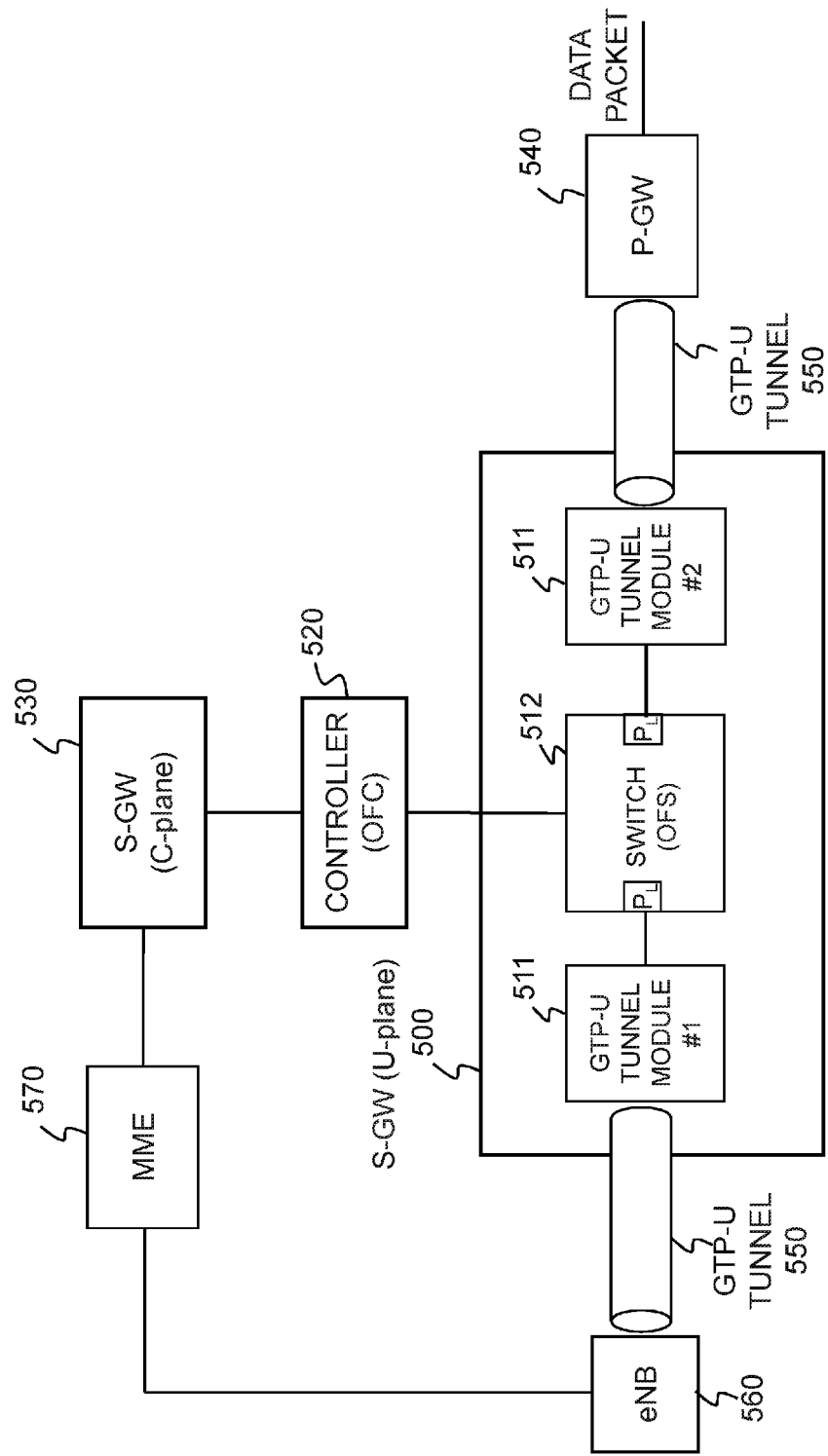
FIG. 20 is a system architecture diagram showing a functional architecture of a communication system according to a second example of the present invention.

Referring to FIG. 20, in a communication system according to a second example of the present invention, the communication apparatus 30 for C-plane and communication apparatus 10 for U-plane according to the first or second exemplary embodiment are applied to S-GWs for U-plane and for C-plane. In the present example, a GTP-U tunnel 550 is illustrated as the above-described logical path 50, and further a U-plane S-GW 500, a controller 520, a C-plane S-GW 530, and a radio base station eNB 560 are illustrated as the communication apparatus 10 for U-plane, control apparatus 20, communication apparatus 30 for C-plane, and other-end communication apparatus 40, respectively. Moreover, the U-plane S-GW 500 is selected by a mobility management entity (MME) 570, and the eNB 560 and the U-plane S-GW 500 are connected through the GTP-U tunnel 550.

The U-plane S-GW 500 is provided with a plurality of GTP-U tunnel modules 511 (GTP-U tunnel modules #1 and #2) correspondingly to the eNB and P-GW, respectively, and a switch 512, which correspond to the above-described logical path modules 11 and packet forward section 12, respectively. The controller 520 has a function of identifying a packet flow, and registers a packet forward rule with the switch 512, thereby controlling the switch 512 so that the switch 512 will add metadata to a packet that matches the packet forward rule and will forward the packet via the GTP-U tunnel module 511, as described above. One of the GTP-U tunnel modules 511 (GTP-U tunnel module #1) in the U-plane S-GW 500 sets up a GTP-U tunnel 550 with the eNB 560, which is an other-end communication apparatus, and performs encapsulation/decapsulation, aliveness monitoring on the other-end communication apparatus using an echo message, and the like, as described above. The other GTP-U tunnel module 511 (GTP-U tunnel module #2) configures a GTP-U tunnel 550 with the P-GW 540, which is an other-end communication apparatus, and performs encapsulation/decapsulation, alive monitoring on the other-end communication apparatus using an echo message, and the like, as described above. Note that metadata exchanged in the present example, in addition to those used in the first example, additionally includes a sequence number included in a GTP-U header. When a packet is received, the GTP-U tunnel modules 511 also include a sequence number in metadata. Moreover, the controller 520 instructs the switch 512 to transfer the above-described sequence number as metadata to the output-target GTP-U tunnel module 511.

As described above, the switch 512 performs an action that matches a packet forward rule from the controller 520, thereby performing the above-described addition of metadata and packet forwarding. Such a network architecture system of centralized control type in which the controller 520 controls the switch 512 in a centralized manner can be implemented by using, for example, OpenFlow, I2RS (Interface to the Routing System), ForCES (Forwarding and Control Element Separation), or the like. Hereinafter, an architecture of a mobile system and operations therein to which OpenFlow is applied will be described as an example of implementation of the controller 520 and switch 512.

4.2) Application Example

Figure 21:
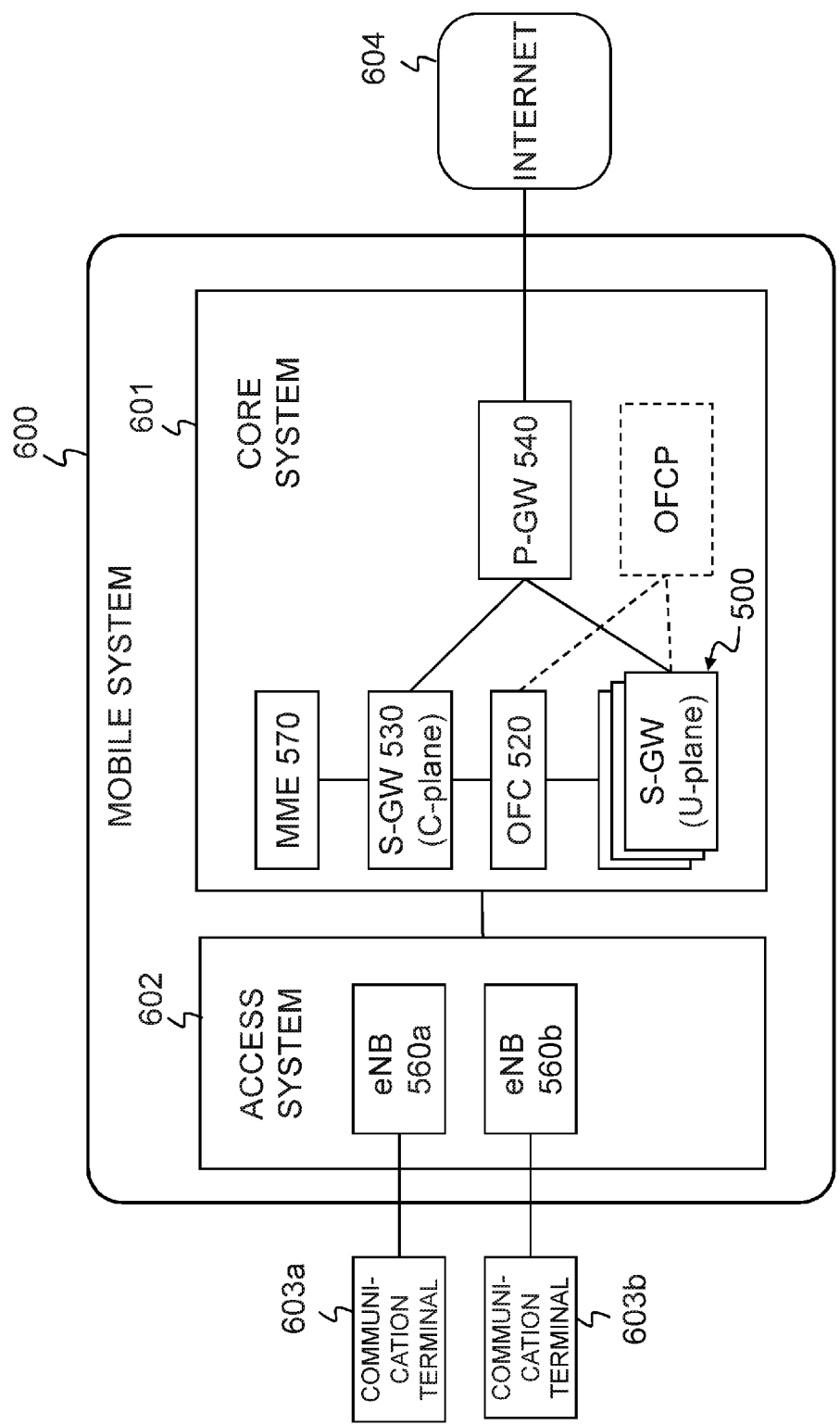
FIG. 21 is a system architecture showing an example of the functional architecture of the communication system according to the second example.

Referring to FIG. 21, a mobile system 600 includes a core system 601 and an access system 602, wherein the core system 601 includes a U-plane S-GW 500, a controller (OFC) 520, a C-plane S-GW 530, a P-GW 540, and a MME 570 as shown in FIG. 20. Note that processing for creation, modification, release, or the like of a GTP-U tunnel at the U-plane S-GW 500 is performed by an OpenFlow configuration function (OFCP: OpenFlow Configuration Point) in general. However, in the present example, it can be performed by the OFC 520.

The access system 602, includes radio base stations, eNBs 560a and 560b, wherein it is assumed here that communication terminals 603a and 603b are connected to the radio base stations, respectively. The access system 602 is a radio access network that provides the communication terminals 603 with connectivity to the mobile system 600, for example, by using a radio access scheme of LTE. The communication terminals 603 are mobile stations such as user terminal UE, mobile telephone, mobile communication terminal, and the like. The communication terminals 603 can connect to an Internet 604, which is an external network, via the mobile system 600.

4.2.1) Default Bearer Construction at S-GW

Figure 22:
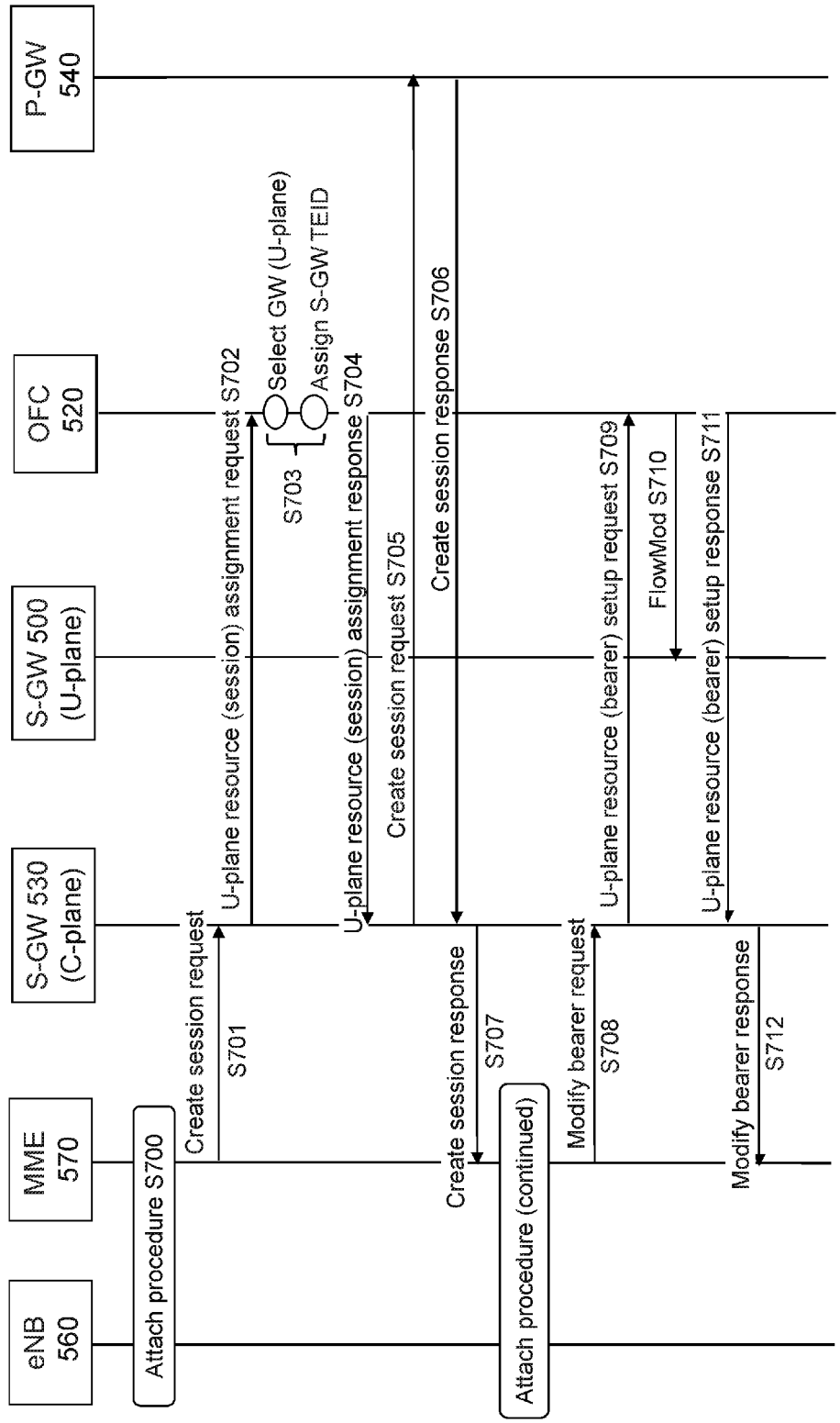
FIG. 22 is a sequence diagram showing an example of a procedure for default bearer construction at S-GW in the communication system shown in FIG. 21.

Referring to FIG. 22, when an attach procedure is started by the eNB 560 and MME 570 (Operation S700), the MME 570 sends a create session request message to the C-plane S-GW 530 (Operation S701). The C-plane S-GW 530, when receiving the create session request message, sends a U-plane resource (session) assignment request message to the OFC 520 (Operation S702).

The OFC 520, when receiving the U-plane resource (session) assignment request message, performs selection of a U-plane S-GW and assignment of GTP-U tunnel identification information (TEID) for the S-GW (Operation S703) and returns a U-plane resource (session) assignment response message to the C-plane S-GW 530 (Operation S704). The C-plane S-GW 530 having received the U-plane resource (session) assignment response message sends a create session request message to the P-GW 540 (Operation S705) and, when receiving a create session response message from the P-GW 540 (Operation S706), sends a create session response message to the MME 570 (Operation S707).

The MME 570 having received the create session response message continues to perform the above-described attach procedure, and sends a modify bearer request message to the C-plane S-GW 530 (Operation S708). When receiving this, the C-plane S-GW 530 sends a U-plane resource (bearer) setup request message to the OFC 520 (Operation S709).

The OFC 520, when receiving the U-plane resource (bearer) setup request message, generates a flow modification (FlowMod) message, which will be described next, and sends it to the U-plane S-GW 500 (Operation S710) and further sends a U-plane resource (bearer) setup response message to the C-plane S-GW 530 (Operation S711). The C-plane S-GW 530 having received the U-plane resource (bearer) setup response message sends a modify bearer response message to the MME570 (Operation S712).

The U-plane S-GW 500 registers flow modification information in the received FlowMod message with the switch 512 as a packet forward rule, whereby prescribed processing is performed on the packets of a target flow. The FlowMod message has the format shown in FIG. 14 and, here, has a structure as follows.

<FlowMod Structure>

With respect to a uplink packet,

Matching field:
- The input port is a logical port $P_L$ associated with the eNB-side GTP tunnel module 511 (GTP-U tunnel module #1);
- (eNB address and) eNB TEID and S-GW TEID as metadata make exact matches; and
- The rest are all wildcards.

Action:
  Add (P-GW address and) P-GW TEID, S-GW TEID, and a bearer sequence number as metadata; and
  Forward to a logical port $P_L$ associated with the P-GW-side GTP tunnel module 511 (GTP-U tunnel module #2).
With respect to a downlink packet,
Matching field:
  The input port is a logical port $P_L$ associated with the P-GW-side GTP tunnel module 511 (GTP-U tunnel module #2);
  (P-GW address and) P-GW TEID and S-GW TEID as metadata make exact matches; and
  The rest are all wildcards.
Action:
  Add (eNB address and) eNB TEID, S-GW TEID, and a bearer sequence number as metadata; and
  Forward to a logical port $P_L$ associated with the eNB-side GTP tunnel module 511 (GTP-U tunnel module #1).

4.2.2) Default Bearer Release at S-GW

Figure 23:
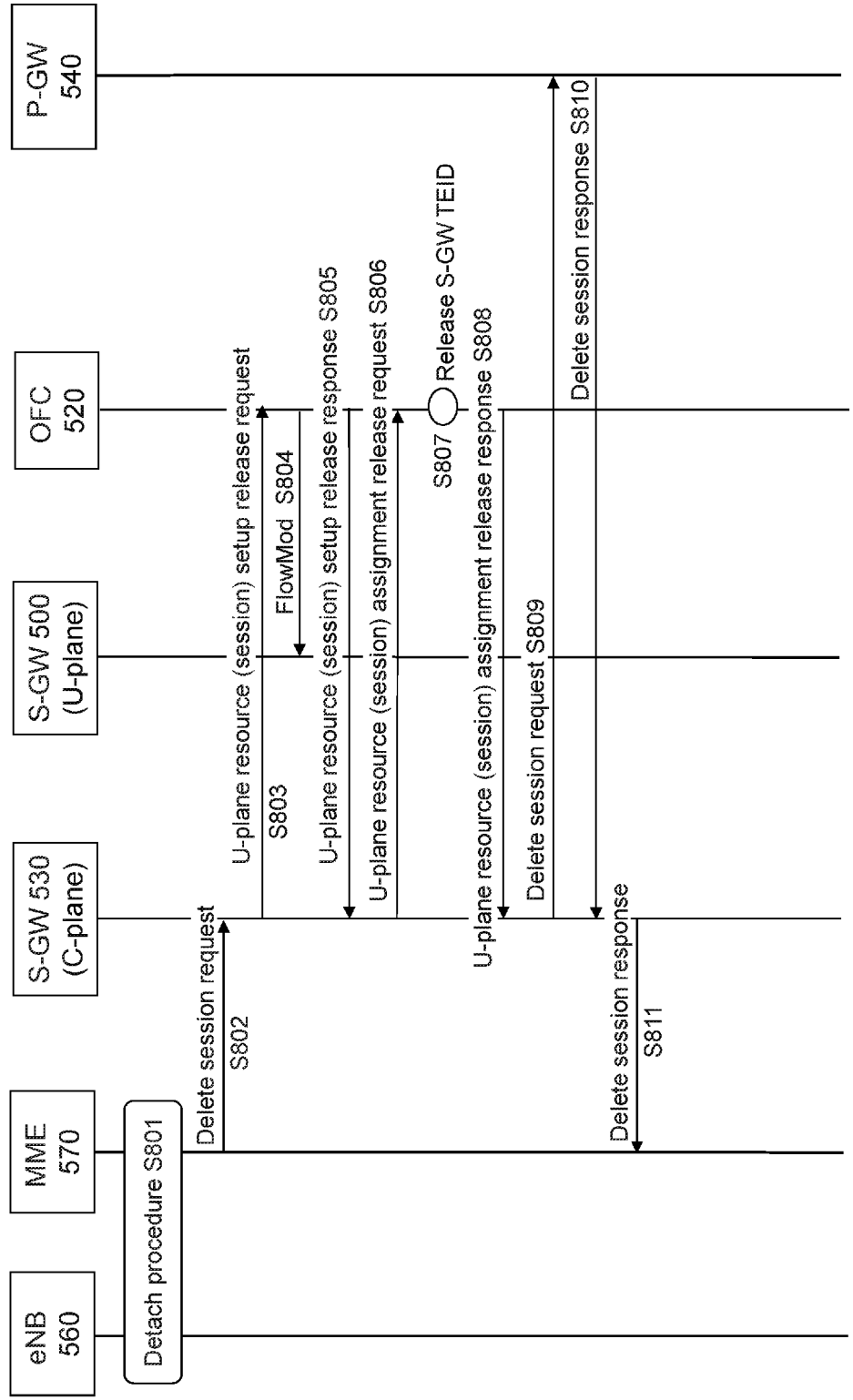
FIG. 23 is a sequence diagram showing an example of a procedure for default bearer release at S-GW in the communication system shown in FIG. 21.

Referring to FIG. 23, a detach procedure is performed by the eNB 560 and MME 570 (Operation S801), and the MME 570 sends a delete session request message to the C-plane S-GW 530 (Operation S802). The C-plane S-GW 530, when receiving the delete session request message, sends a U-plane resource (session) setup release request message to the OFC 520 (Operation S803).

The OFC 520, when receiving the U-plane resource (session) setup release request message, generates a FlowMod message and sends it to the U-plane S-GW 500 (Operation S804) and further sends a U-plane resource (session) setup release response message to the C-plane S-GW 530 (Operation S805). The C-plane S-GW 530 having received the U-plane resource (session) setup release response message sends a U-plane resource (session) assignment release request message to the OFC 520 (Operation S806).

The OFC 520, when receiving the U-plane resource (session) assignment release request message, releases the TEID of the U-plane S-GW (Operation S807) and sends a U-plane resource (session) assignment release response message to the C-plane S-GW 530 (Operation S808). When receiving this, the C-plane S-GW 530 sends a delete session request message to the P-GW 540 (Operation S809) and, when receiving a delete session response message as a response thereto (Operation S810), sends a delete session response message to the MME 570 (Operation S811).

The U-plane S-GW 500 releases a packet forward rule in accordance with flow modification information in the received FlowMod message. The FlowMod in this case instructs perform deletion, using the same matching rules that are used in the above-described bearer construction.

4.2.3) Dedicated Bearer Construction at S-GW

Figure 24:
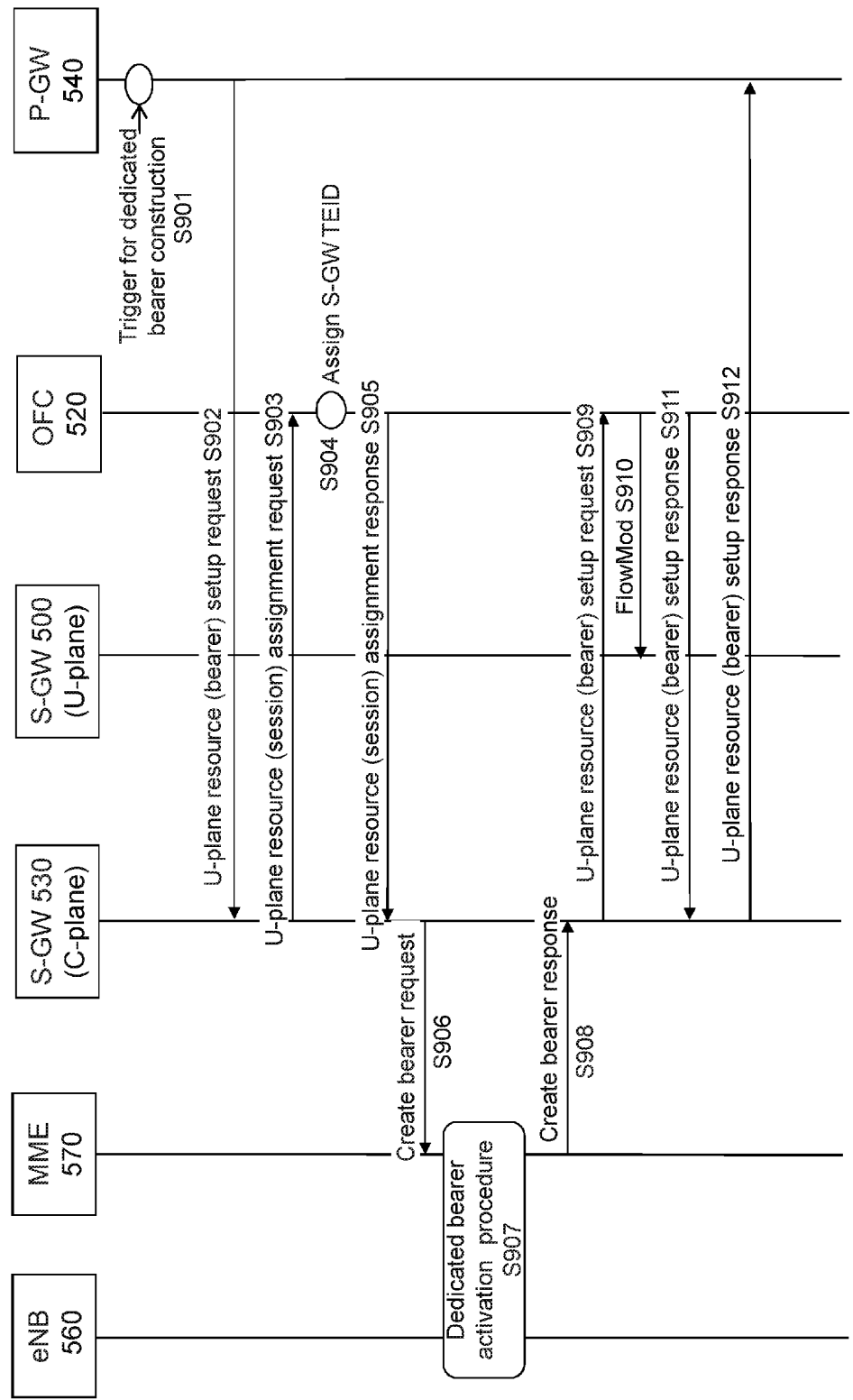
FIG. 24 is a sequence diagram showing an example of a procedure for dedicated bearer construction at S-GW in the communication system shown in FIG. 21.

Referring to FIG. 24, the P-GW 540, when detecting a trigger for dedicated bearer construction (Operation S901), sends a U-plane resource (bearer) setup request message to the C-plane S-GW 530 (Operation S902). The C-plane S-GW 530 having received it sends a U-plane resource (session) assignment request message to the OFC 520 (Operation S903).

OFC 520, when receiving the U-plane resource (session) assignment request message, assigns a TEID for a U-plane S-GW (Operation S904) and returns a U-plane resource (session) assignment response message to the C-plane S-GW 530 (Operation S905). The C-plane S-GW 530 having received the U-plane resource (session) assignment response message sends a create bearer request message to the MME 570 (Operation S906), and a dedicated bearer activation procedure is performed by the eNB 560 and MME 570 (Operation S907). Subsequently, the MME 570 sends a create bearer response message to the C-plane S-GW 530 (Operation S908), and the C-plane S-GW 530, when receiving this, sends a U-plane resource (bearer) setup request message to the OFC 520 (Operation S909).

The OFC 520, when receiving the U-plane resource (bearer) setup request message, generates a flow modification (FlowMod) message, which will be described next, and sends it to the U-plane S-GW 500 (Operation S910) and further sends a U-plane resource (bearer) setup response message to the C-plane S-GW 530 (Operation S911). The C-plane S-GW 530, when receiving the U-plane resource (bearer) setup response message, sends a U-plane resource (bearer) setup response message to the P-GW 540 (Operation S912).

The U-plane S-GW 500 registers flow modification information in the FlowMod message with the switch 512 as a packet forward rule, and the switch 512 performs prescribed processing on the packets of a target flow in accordance with this rule. The FlowMod message has the format shown in FIG. 14. The structure thereof is the same as in the case of default bearer construction at S-GW described above, and therefore a description thereof will be omitted.

4.2.4) Dedicated Bearer Release at S-GW

Figure 25:
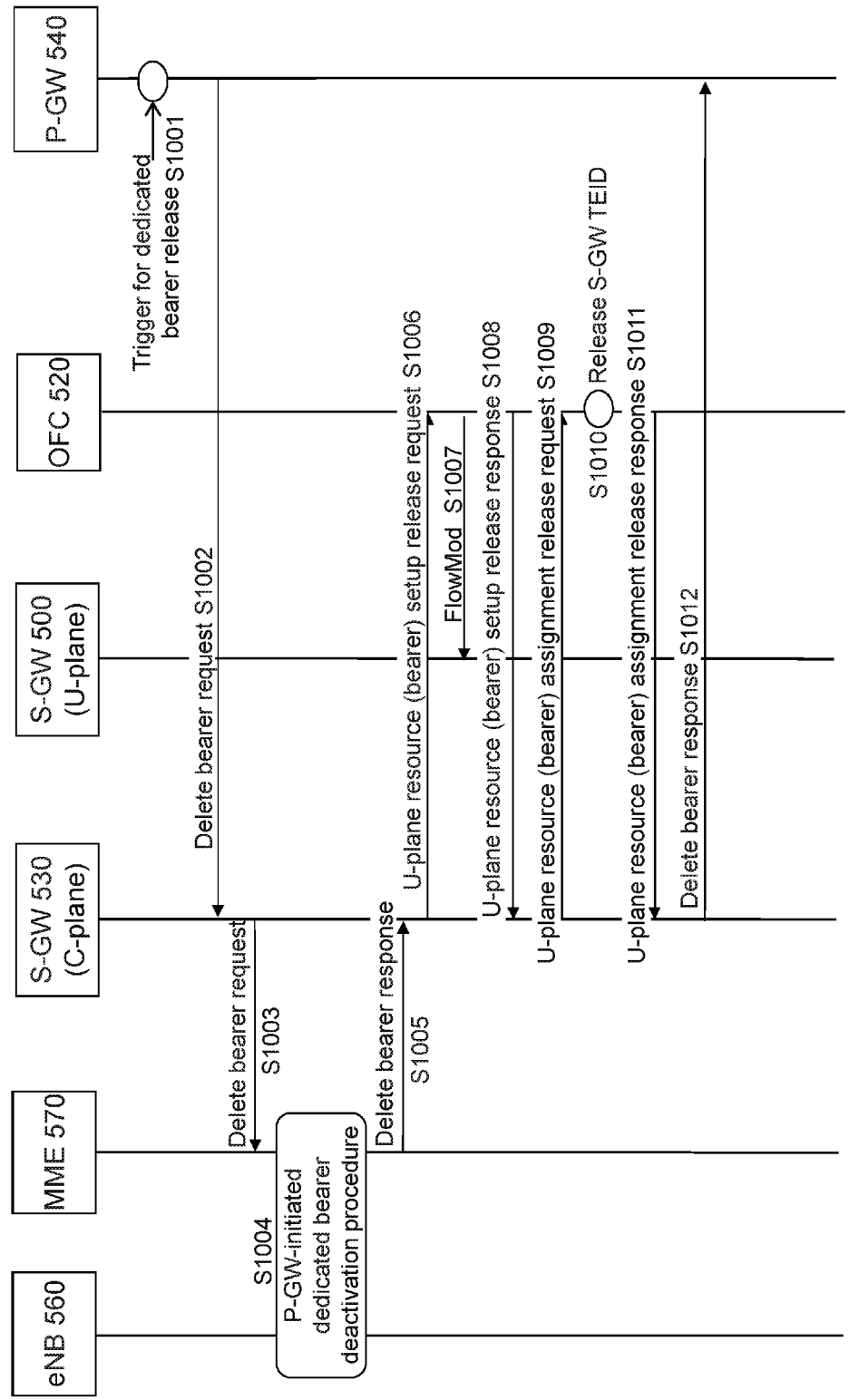
FIG. 25 is a sequence diagram showing an example of a procedure for dedicated bearer release at S-GW in the communication system shown in FIG. 21.

Referring to FIG. 25, the P-GW 540, when detecting a trigger for dedicated bearer release (Operation S1001), sends a delete bearer request message to the C-plane S-GW 530 (Operation S1002). The C-plane S-GW 530 having received it sends a delete bearer request message to the MME 570 (Operation S1003), and a dedicated bearer deactivation procedure is performed by the eNB 560 and MME 570 (Operation S1004). Subsequently, the MME 570 sends a delete bearer response message to the C-plane S-GW 530 (Operation S1005), and the C-plane S-GW 530, when receiving this, sends a U-plane resource (bearer) setup release request message to the OFC 520 (Operation S1006).

The OFC 520, when receiving the U-plane resource (bearer) setup release request message, generates a flow modification (FlowMod) message, which will be described next, and sends it to the U-plane S-GW 500 (Operation S1007) and further sends a U-plane resource (bearer) setup release response message to the C-plane S-GW 530 (Operation S1008). The C-plane S-GW 530, when receiving the U-plane resource (bearer) setup release response message, sends a U-plane resource (bearer) assignment release request message to the OFC 520 (Operation S1009).

The OFC 520, when receiving the U-plane resource (bearer) assignment release request message, releases the TEID of the U-plane S-GW (Operation S1010) and sends a U-plane resource (bearer) assignment release response message to the C-plane S-GW 530 (Operation S1011). The C-plane S-GW 530, when receiving this, sends a delete bearer response message to the P-GW 540 (Operation S1012).

The U-plane S-GW 500 registers flow modification information in the FlowMod message with the switch 512 as a packet forward rule, and the switch 512 performs prescribed processing on the packets of a target flow in accordance with this rule. The FlowMod message has the format shown in FIG. 14. The structure thereof is the same as in the case of default bearer release at S-GW described above, and therefore a description thereof will be omitted.

4.3) Release/Restoration of S1 Connection

Referring back to FIG. 21, a S1-U connection between the access system 602 and the U-plane S-GW 500 sometimes falls in an idle state depending on the state of a communication terminal and recovers from the idle state due to the occurrence of data sent from a communication terminal or the arrival of data addressed to a communication terminal. Hereinafter, a description will be given of operations for S1 connection release/restoration in the second example of the present invention.

4.3.1) S1 connection release at S-GW

Figure 26:
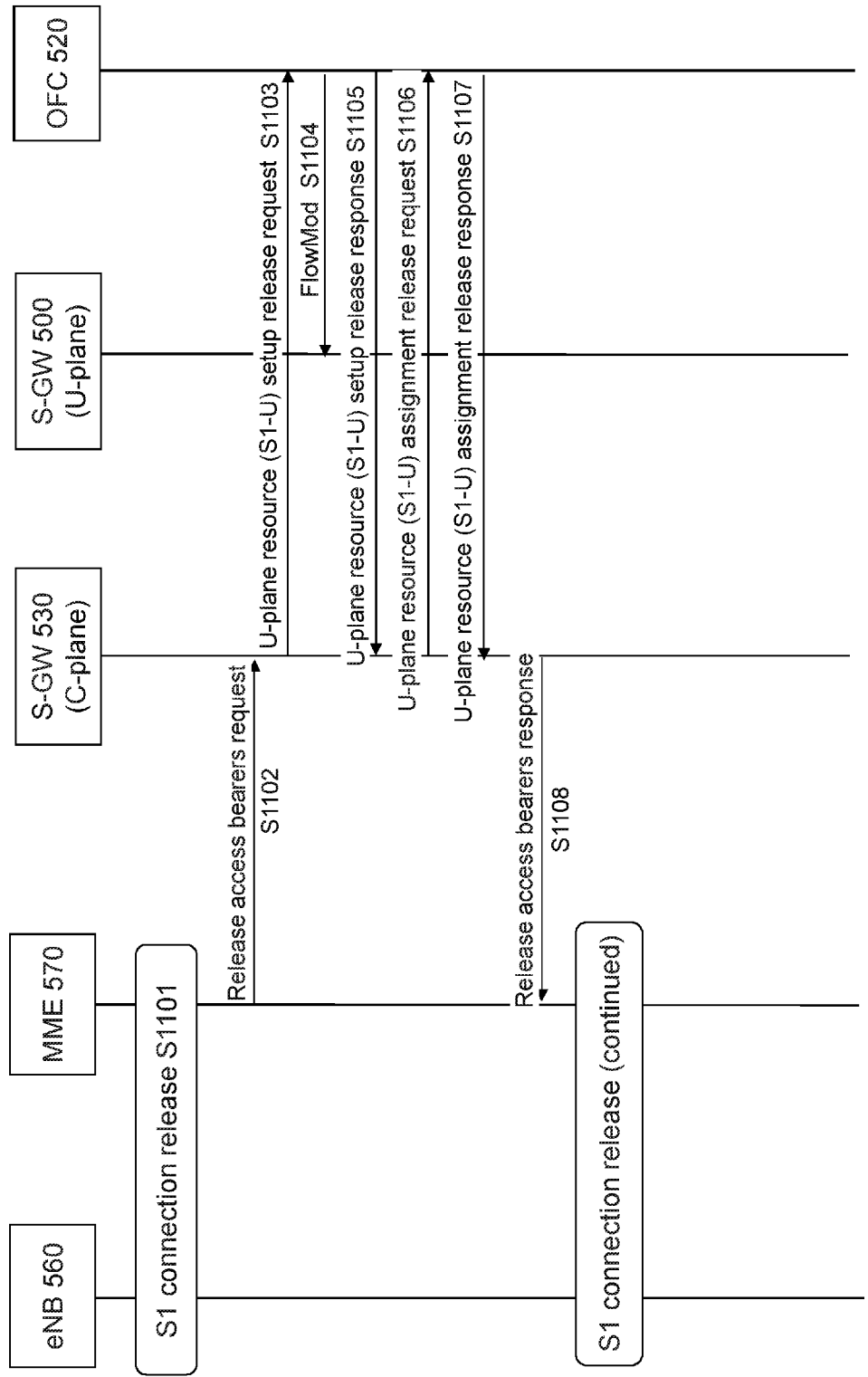
FIG. 26 is a sequence diagram showing an example of a procedure for S1 connection release at S-GW in the communication system shown in FIG. 21.

Referring to FIG. 26, when a S1 connection release procedure is started by the eNB 560 and MME 570 (Operation S1101), the MME 570 sends a release access bearers request message to the C-plane S-GW 530 (Operation S1102). The C-plane S-GW 530, when receiving the release access bearers request message, sends a U-plane resource (S1-U) setup release request message to the OFC 520 (Operation S1103).

The OFC 520, when receiving the U-plane resource (S1-U) setup release request message, generates a FlowMod message and sends it to the U-plane S-GW 500 (Operation S1104) and further sends a U-plane resource (S1-U) setup release response message to the C-plane S-GW 530 (Operation S1105). The C-plane S-GW 530 having received the U-plane resource (S1-U) setup release response message sends a U-plane resource (S1-U) assignment release request message to the OFC 520 (Operation S1106).

The OFC 520, when receiving the U-plane resource (S1-U) assignment release request message, sends a U-plane resource (S1-U) assignment release response message to the C-plane S-GW 530 (Operation S1107). The C-plane S-GW 530 sends a release access bearers response message to the MME 570 (Operation S1108), and the above-described S1 connection release procedure is performed continuously.

The U-plane S-GW 500, in accordance with flow modification information in the received FlowMod message, deletes an existing flow entry with respect to the uplink. With respect to the downlink, Matching field remains the same as an existing flow entry, and Action indicates to forward to a port toward the OFC 520.

4.3.2) UE-Triggered S1 Connection Restoration at S-GW

Figure 27:
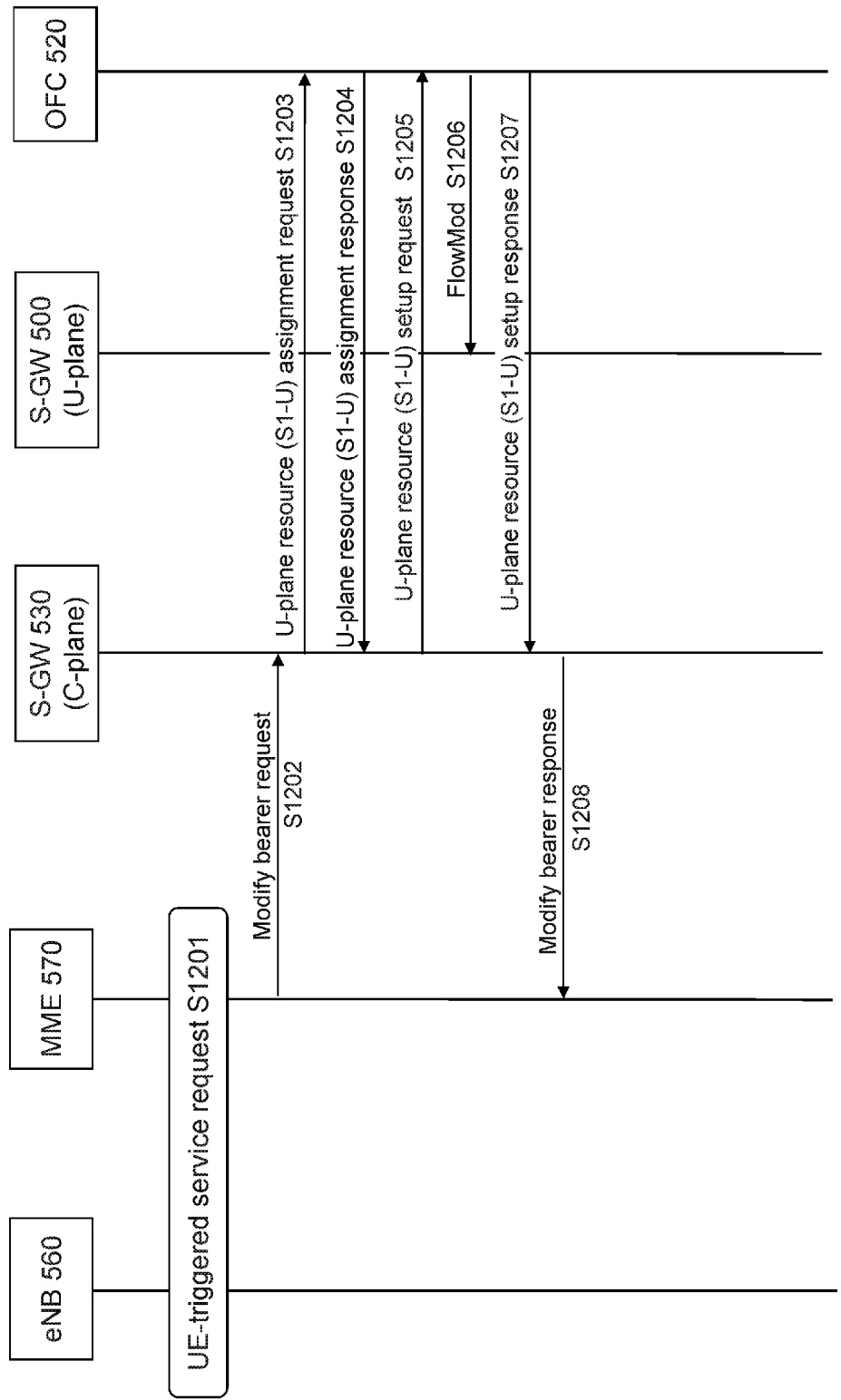
FIG. 27 is a sequence diagram showing an example of a procedure for UE-triggered service request at S-GW in the communication system shown in FIG. 21.

Referring to FIG. 27, when a service request is made by a communication terminal UE (Operation S1201), the MME 570 sends a modify bearer request message to the C-plane S-GW 530 (Operation S 1202). The C-plane S-GW 530, when receiving the modify bearer request message, sends an U-plane resource (S1-U) assignment request message to the OFC 520 (Operation S1203).

The OFC 520, when receiving the U-plane resource (S1-U) assignment request message, returns a U-plane resource (S1-U) assignment response message to the C-plane S-GW 530 (Operation S1204). The C-plane S-GW 530 having received the U-plane resource (S1-U) assignment response message sends a U-plane resource (S1-U) setup request message to the OFC 520 (Operation S1205).

The OFC 520, when receiving the U-plane resource (S1-U) setup request message, generates a flow modification (FlowMod) message, which will be described next, and sends it to the U-plane S-GW 500 (Operation S1206) and further sends a U-plane resource (S1-U) setup response message to the C-plane S-GW 530 (Operation S1207). The C-plane S-GW 530 having received the U-plane resource (S1-U) setup response message sends a modify bearer response message to the MME 570 (Operation S1208).

The U-plane S-GW 500 registers flow modification information in the received FlowMod message with the switch 512 as a packet forward rule, whereby prescribed processing is performed on the packets of a target flow. The FlowMod message has the format shown in FIG. 14 and has the same structure as in the case of default bearer construction at S-GW described above, but as many flow entries are generated as the number of those hitherto generated or a number requested.

4.3.3) NW-Triggered S1 Connection Restoration at S-GW

Figure 28:
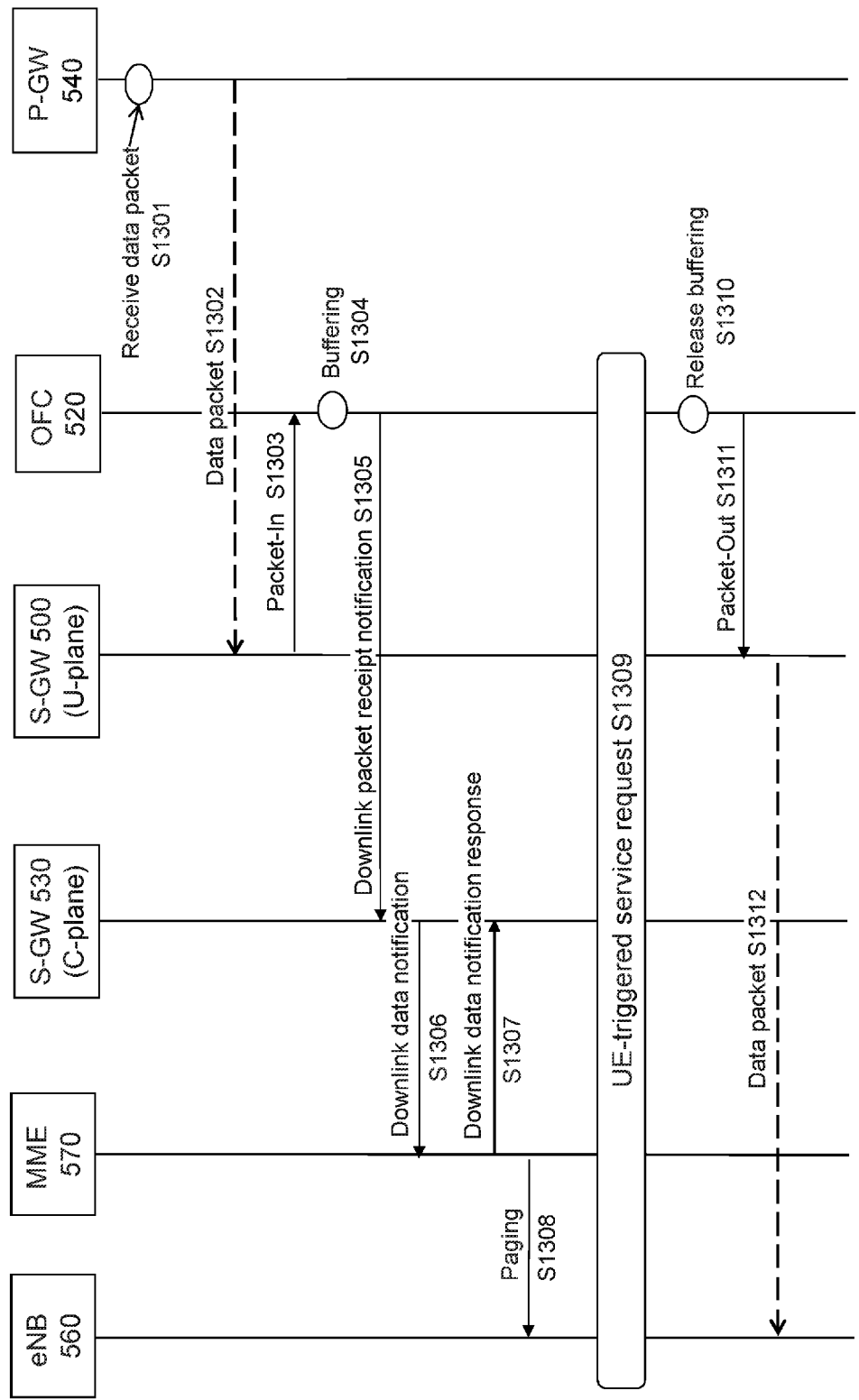
FIG. 28 is a sequence diagram showing an example of a procedure for NW-triggered service request at S-GW in the communication system shown in FIG. 21.

Referring to FIG. 28, the P-GW 540, when receiving a data packet from a network (Operation S1301), sends this received data packet to the U-plane S-GW 500 (Operation S1302). The U-plane S-GW 500 having received the new data packet, if any flow entry that matches header information in this packet is not registered with the switch 512, notifies this packet to the OFC 520 by using a Packet-In message (Operation S1303). The Packet-In message is the same as an ordinary Packet-In message, except that the input port is a logical port $P_L$ associated with a relevant GTP tunnel module 511 and that (P-GW address and) P-GW TEID and S-GW TEID are included as metadata.

The OFC 520, when receiving the Packet-In message, buffers processing (Operation S1304) and sends a downlink packet receipt notification message to the C-plane S-GW 530 (Operation 1305), and the C-plane S-GW 530 having received this sends a downlink data notification message to the MME 570 (Operation S1306). The MME 570 returns a downlink data notification response message to the C-plane S-GW 530 (Operation S1307) and also sends a paging message to the eNB 560 (Operation S1308).

Triggered by paging, a S1-U connection is established through the above-described UE-triggered service request operations (FIG. 27) (Operation S1309), and then the OFC 520 releases the buffering of processing (Operation S1310) and sends a Packet-Out message to the U-plane S-GW 500 (Operation S1311). The Packet-Out message is the same as an ordinary Packet-Out message, except that (eNB address and) eNB TEID and S-GW TEID are added as metadata and that Action in a flow entry is set such as to forward to a logical port $P_L$ associated with a relevant GTP tunnel module 511.

The U-plane S-GW 500 forwards the data packet to the eNB 560 in accordance with a packet forward rule that is set based on the Packet-Out message (Operation S1312).

5. Other Application Example

In the above-described examples, a GTP tunnel is illustrated as a logical path. However, it is also possible to employ a LTE tunnel supporting PMIP (Proxy Mobile IP)/GRE (Generic Routing Encapsulation) or the like. Moreover, at S-GW, it is also possible to use a method supporting BBERF (Bearer Biding and Event Reporting Function), in which forwarding is performed after a mapping is released, not TEID-associated packet forwarding as described above.

6. Third Exemplary Embodiment

In the above-described second exemplary embodiment and examples, the communication apparatus for U-plane has a configuration in which a logical path module (GTP-U tunnel module) is provided to a logical port of the packet forward section (switch), as shown in FIG. 5. However, the present invention is not limited to this. For example, it is also possible to make a configuration such that a plurality of communication apparatuses for U-plane as shown in FIG. 5 are deployed and connected to each other by using switches that can control them, and one or some of the communication apparatuses for U-plane are selected depending on the network load or the like. Hereinafter, an application to P-GW will be described as a second exemplary embodiment of the present invention. Note that it is possible to apply the technologies mentioned in the above-described first and second exemplary embodiments to the third exemplary embodiment.

Figure 29:
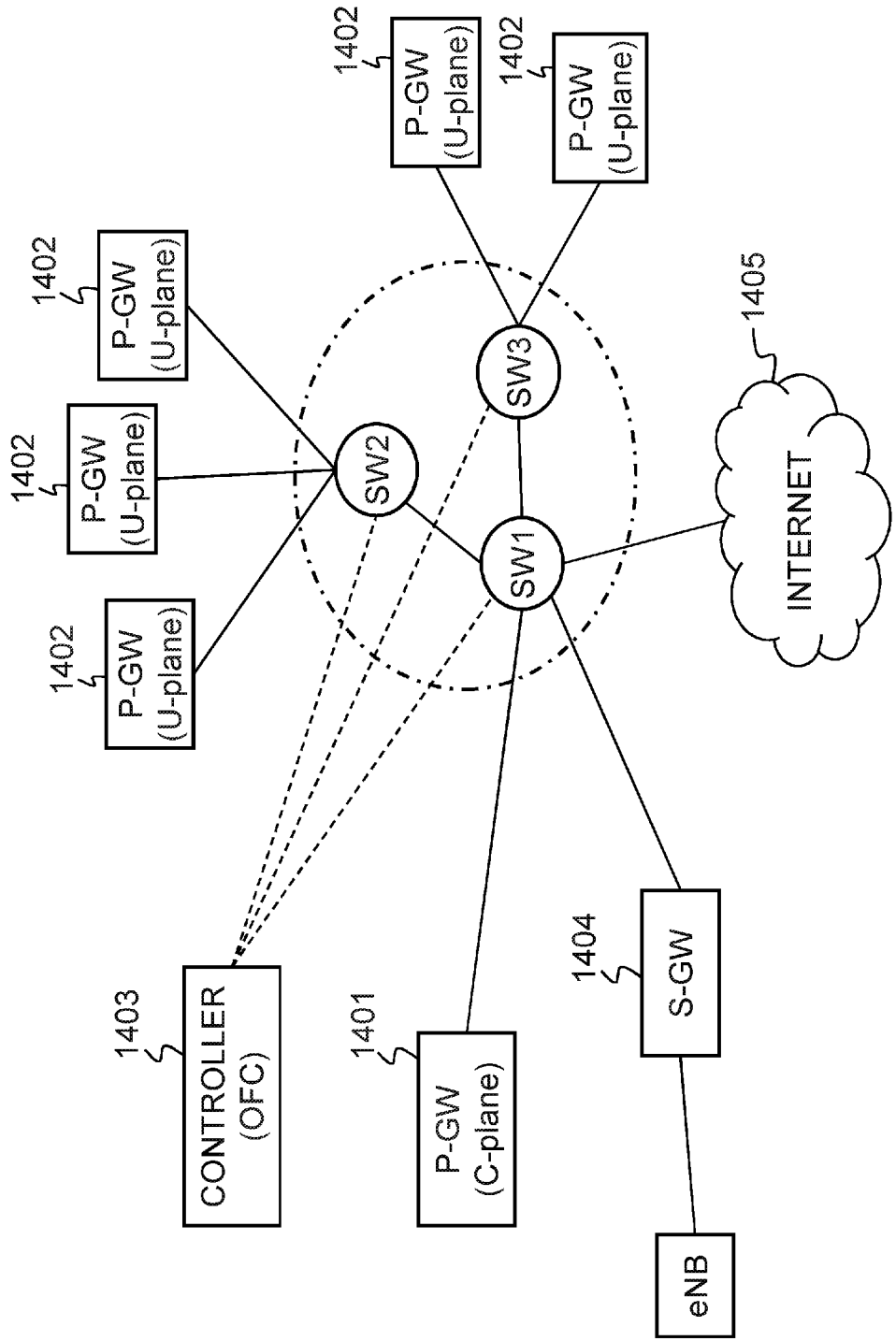
FIG. 29 is a schematic architecture diagram of a communication system according to a third exemplary embodiment of the present invention.

Referring to FIG. 29, in a communication system according to the third exemplary embodiment of the present invention, it is assumed that a C-plane P-GW 1401 and a plurality of U-plane P-GWs 1402 are connected to switches SW1 to SW3, and that a controller 1403 controls not only the U-plane P-GWs 1402 but also the switches SW1 to SW3 by using the OpenFlow technology. Here, a S-GW 1404 and the Internet 1405 are connected to the switch SW1.

The controller 1403, considering the respective loads on the U-plane P-GWs 1402, can control the setup of a GTP-U tunnel (logical path) between which U-plane P-GW and the S-GW 1404, or which GTP-U tunnel is deleted.

As described above, according to the third exemplary embodiment of the present invention, the controller 1403 is interposed between the C-plane P-GW 1401 and the plurality of U-plane P-GWs 1402 via the switches SW1 to SW3 that can be controlled by the controller 1403, whereby, in addition to the effects of the first and second exemplary embodiments, it is possible to flexibly select a logical path route between the S-GW 1404 and a U-plane P-GW 1402 and thus to further easily increase/decrease the U-plane processing function.

7. Fourth Exemplary Embodiment

It is possible to apply the techniques as mentioned in the above-described first to third exemplary embodiments to a fourth exemplary embodiment of the present invention.

In the fourth exemplary embodiment, a virtual S-GW is constructed by using software such as Virtual Machine in a communication system. The virtual S-GW is constructed such as to include a plurality of U-plane S-GWs (S-GW (U-plane)), and a U-plane S-GW to be passed through is selected depending on a bearer.

Figure 30:
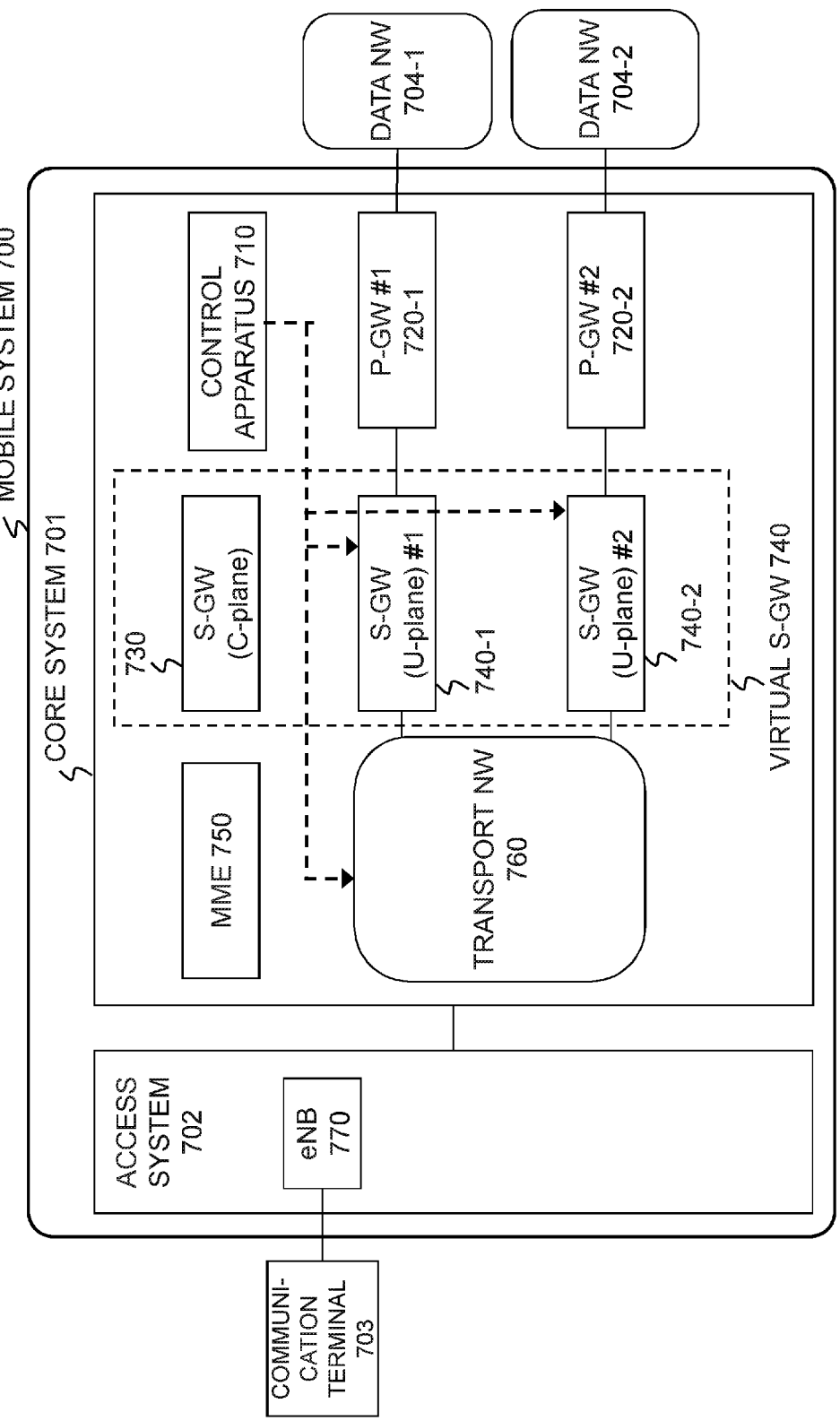
FIG. 30 is a schematic architecture diagram showing an example of a communication system according to a fourth exemplary embodiment of the present invention.

In some existing communication systems, as shown in FIG. 30, a plurality of P-GWs (P-GWs 720-1 and 720-2 in FIG. 30) may be deployed correspondingly to communication networks (data networks 704-1 and data networks 704-2 in FIG. 30). In a communication system with such an architecture, it is conceivable that if all bearers pass through a specific S-GW, the S-GW forms a bottleneck in communication. According to the fourth exemplary embodiment, a U-plane S-GW is deployed for each of the plurality of P-GWs corresponding to the communication networks. Accordingly, it is possible to distribute respective communication corresponding to the communication networks among the plurality of U-plane S-GWs, whereby a bottleneck in communication can be resolved.

FIG. 30 shows an example of the architecture of a communication system according to the fourth exemplary embodiment.

A mobile system 700 includes an access system 702, which includes a base station (eNB) 770 that performs wireless communication with a communication terminal 703.

The mobile system 700 includes a core system 701. The core system 701 includes the P-GWs 720-1 and 720-2 that correspond to the plurality of data networks 704-1 and 704-2, respectively. Note that it is also possible that a plurality of P-GWs are deployed for each of the data networks. For example, a plurality of P-GWs 720-1 may be deployed for the data network 704-1. The core system 701 includes a virtual S-GW 740 that is constructed by using software such as Virtual Machine. The virtual S-GW 740 includes a C-plane S-GW and a plurality of U-plane S-GWs 740-1 and 740-2 that correspond to the plurality of P-GWs 720-1 and 720-2, respectively. For example, the virtual S-GW 740 is constructed by activating software such as Virtual Machine on a server or general communication equipment. The C-plane S-GW 730 may be an apparatus different from an apparatus on which the virtual S-GW 740 is constructed. Moreover, it is also possible that the C-plane S-GW 730 is constructed by using software such as Virtual Machine on the apparatus on which the virtual S-GW 740 is constructed.

For example, the U-plane S-GWs 740-1 and 740-2 may have a configuration similar to that of the U-plane S-GW 500 illustrated in FIG. 20. For example, the U-plane S-GWs 740-1 and 740-2 each can execute functions corresponding to the GTP-U tunnel module 511 and switch 512 illustrated in FIG. 20 by using software applications operating on Virtual Machine. The functions corresponding to the GTP-U tunnel module 511 and switch 512 are as described in the above-described second exemplary embodiment, and therefore a description thereof in the fourth exemplary embodiment will be omitted. Moreover, the configurations of the U-plane S-GWs 740-1 and 740-2 may be designed to modify information included in the outer header, not to perform decapsulation processing and encapsulation processing in combination. Examples of the information to be modified here include, but are not limited to, information for identifying a logical path included in the outer header, such as source and destination IP addresses and a Tunneling Endpoint Identifier (TEID).

A control apparatus 710 controls the U-plane S-GWs 740-1 and 740-2 and a transport network 760, for example, by using a control protocol such as OpenFlow, I2RS, or ForCES. The control apparatus 710 according to the fourth exemplary embodiment has functions similar to those of the OFC 520 described in the second exemplary embodiment, and therefore a detailed description thereof will be omitted in the fourth exemplary embodiment. However, the functions of the control apparatus 710 are not limited to those of the OFC 520.

The control apparatus 710 selects a U-plane S-GW 740 for a communication to pass through, depending on the data network 704 which the communication terminal 703 communicates with. Moreover, the control apparatus 710 assigns identification information to a bearer that passes through the selected U-plane S-GW 740.

Figure 31:
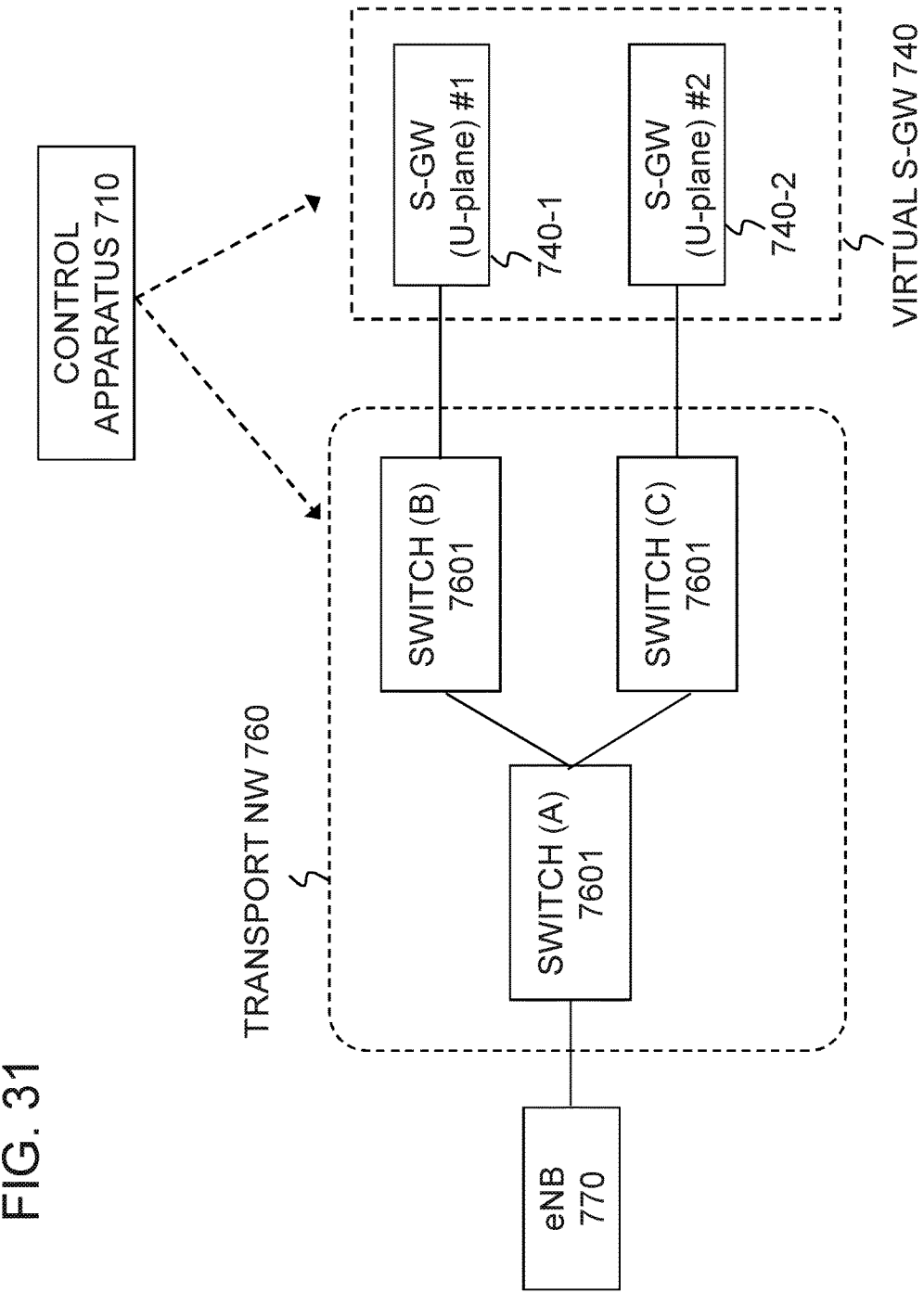
FIG. 31 is an architecture diagram showing an example of a transport network in the communication system shown in FIG. 30.

Referring to FIG. 31, the transport network 760 includes a plurality of switches 7601. For example, each switch 7601 has functions similar to those of the OpenFlow switch 391 shown in FIG. 13.

The control apparatus 710 controls the transport network 760 and constructs the communication routes of bearers (GTP-U tunnels) for communication with the data networks 704-1 and 704-2, between the eNB 770 and the virtual S-GW 740. An IP address is assigned to the virtual S-GW 740, and the eNB 770 sends respective communication traffics corresponding to the data networks 704-1 and 704-2 to the IP address of the virtual S-GW 740. Note that the eNB 770 encapsulates the respective communication traffics corresponding to the data networks 704-1 and 704-2 with bearer identification information (a TEID) also included. For example, identification information assigned to a bearer forwarded from the eNB 770 to the U-plane S-GW 740-1 (hereinafter, referred to as TEID (A)) is different from identification information assigned to a bearer forwarded from the eNB 770 to the U-plane S-GW 740-2 (hereinafter, referred to as TEID (B)). Accordingly, the bearers can be discriminated from each other based on the identification information. Note that identification information assigned to a bearer forwarded from the U-plane S-GW 740-1 to the eNB 770 is assumed to be TEID (C), and identification information assigned to a bearer forwarded from the U-plane S-GW 740-2 to the eNB 770 is assumed to be TEID (D).

In the example of FIG. 31, for example, the control apparatus 710 decides on the switches (A) and (B) as switches 7601 that a bearer sent from the eNB 770 to the U-plane S-GW 740-1 will pass through. The control apparatus 710 instructs the switch (A) to forward to the switch (B) a packet that has the IP address of the virtual S-GW 740 as its destination address and has TEID (A) as bearer identification information. Moreover, the control apparatus 710 instructs the switch (B) to forward to the U-plane S-GW 740-1 a packet that has the IP address of the virtual S-GW 740 as its destination address and has TEID (A) as bearer identification information.

In the example of FIG. 31, for example, the control apparatus 710 decides on the switches (A) and (C) as switches 7601 that a bearer sent from the eNB 770 to the U-plane S-GW 740-2 will pass through. The control apparatus 710 instructs the switch (A) to forward to the switch (C) a packet that has the IP address of the virtual S-GW 740 as its destination address and has TEID (B) as bearer identification information. Moreover, the control apparatus 710 indicates to the switch (C) to forward to the U-plane S-GW 740-2 a packet that has the IP address of the virtual S-GW 740 as its destination address and has TEID (B) as bearer identification information.

In the example of FIG. 31, for example, the control apparatus 710 decides on the switches (B) and (A) as switches 7601 that a bearer sent from the U-plane S-GW 740-1 to the eNB 770 will pass through. The control apparatus 710 instructs the switch (B) to forward to the switch (A) a packet that has the IP address of the eNB 770 as its destination address and has TEID (C) as bearer identification information. Moreover, the control apparatus 710 indicates to the switch (A) to forward to the eNB 770 a packet that has the IP address of the eNB 770 as its destination address and has TEID (C) as bearer identification information.

In the example of FIG. 31, for example, the control apparatus 710 decides on the switches (C) and (A) as switches 7601 that a bearer sent from the U-plane S-GW 740-2 to the eNB 770 will pass through. The control apparatus 710 instructs the switch (C) to forward to the switch (A) a packet that has the IP address of the eNB 770 as its destination address and has TEID (D) as bearer identification information. Moreover, the control apparatus 710 indicates to the switch (A) to forward to the eNB 770 a packet that has the IP address of the eNB 770 as its destination address and has TEID (D) as bearer identification information.

Figure 32:
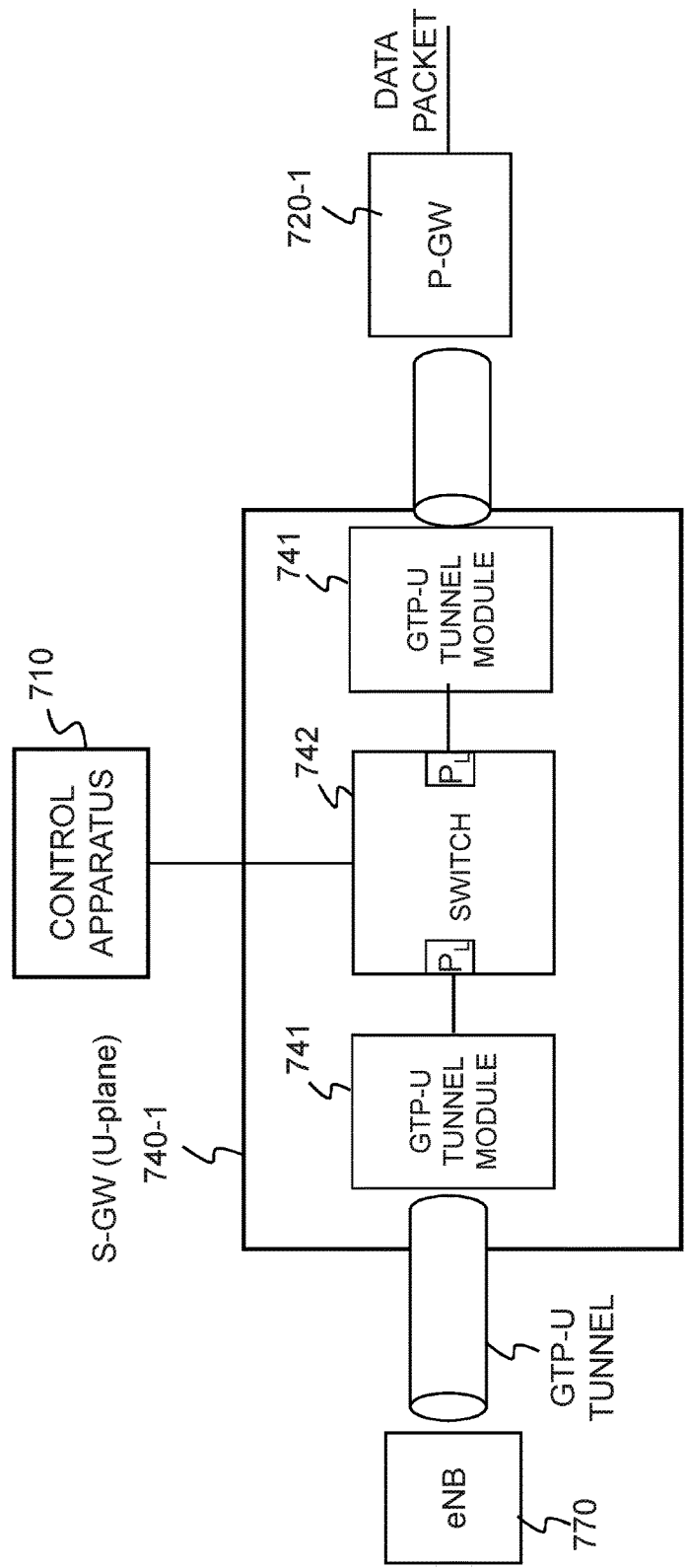
FIG. 32 is a block diagram showing an example of the configuration of a U-plane S-GW in the communication system shown in FIG. 30.

The control apparatus 710 controls each of the U-plane S-GWs 740-1 and 740-2. FIG. 32 shows an example of the configuration of the U-plane S-GW. The U-plane S-GW 740 includes GTP-U tunnel modules 741 and a switch 742. Each GTP-U tunnel module 741 is connected to a logical port $P_L$ of the switch. The control apparatus 710 controls the switch 742. For example, the GTP-U tunnel modules 741 are deployed on the eNB 770 side and on the P-GW 720 side, respectively. Note that a GTP-U tunnel module 741 that is common to the eNB 770 and P-GW 720 sides may be deployed. In this case, the common GTP-U tunnel module 741 is connected to each of a logical port $P_L$ corresponding to the eNB 770 side and a logical port $P_L$ corresponding to the P-GW 720 side.

Hereinafter, an example will be described in which the control apparatus 710 controls the U-plane S-GW in accordance with the OpenFlow protocol. However, the present invention is not limited to the OpenFlow protocol.

The control apparatus 710 sets a flow entry in the switch 742 in accordance with the OpenFlow protocol.

The control apparatus 710 sets a flow entry with the following contents with respect to uplink packets (packets sent in the direction from eNB to U-plane S-GW). Matching field:
  The input port is a logical port $P_L$ associated with the GTP tunnel module 741 on the eNB 770 side;
  Metadata (a TEID for communication with eNB) included in a packet exactly matches the identification information of a bearer configured between the eNB 770 and the U-plane S-GW; and
  The rest are all wildcards.
Action:
  Add metadata (a TEID for communication with P-GW and a sequence number included in the metadata at the time of receiving the packet) to the packet; and
  Forward to a logical port $P_L$ associated with the GTP tunnel module 742 on the P-GW 720 side.

The control apparatus 710 sets a flow entry with the following contents with respect to downlink packets (packets to be sent in the direction from U-plane S-GW to eNB). Matching field:
  The input port is a logical port $P_L$ associated with the GTP tunnel module 741 on the P-GW side;
  Metadata (a TEID for communication with P-GW) included in a packet exactly matches the identification information of a bearer configured between the P-GW 720 and the U-plane S-GW; and
  The rest are all wildcards.
Action:
  Add metadata (a TEID for communication with eNB and a sequence number included in the metadata at the time of receiving the packet) as metadata; and
  Forward to a logical port $P_L$ associated with the GTP tunnel module 741 on the eNB 770 side.

FIG. 33 shows an example of operations in the fourth exemplary embodiment. Note that a detailed description will be given below of operations that are different from the example of operations described with reference to FIG. 22, omitting a description of similar operations.

In Operation S803, the control apparatus 710 selects a U-plane S-GW 740 for a communication to pass through, depending on a data network 704 which the communication terminal 703 communicates with. Moreover, the control apparatus 710 assigns identification information to a bearer that passes through the selected U-plane S-GW 740.

In Operations S810 and S811, the control apparatus 710 controls the transport network 760 and U-plane S-GW 740, through the operations described above with reference to FIGS. 31 and 32.

FIG. 34 shows another example of the system architecture according to the fourth exemplary embodiment.

In the example of the system architecture of FIG. 30, the virtually constructed U-plane S-GWs 740-1 and 740-2 are deployed in the core system 701. In contrast, in the example of the system architecture of FIG. 34, part (e.g., the U-plane S-GW 740-2 in FIG. 34) of virtually constructed U-plane S-GWs is deployed in a base station. Note that the C-plane S-GW 730, U-plane S-GW 740-1, and U-plane S-GW 740-2 constitute the virtual S-GW 740, and IP addresses are not assigned to the U-plane S-GWs 740-1 and 740-2, respectively, but an IP address (hereinafter, IP address (A)) is assigned to the virtual S-GW 740, as in the example of FIG. 30.

An extended eNB 771 includes an eNB 7710, which has functions similar to those of the eNB 770 in FIG. 30, the U-plane S-GW 740-2, and an IPsec function 7712. The U-plane S-GW 740-2 has a configuration similar to that illustrated in FIG. 32.

With the system architecture shown in FIG. 34, it is possible to deploy a core system in which no S-GW is included and only a P-GW for accessing a data network is deployed, at a location near the access system 702. Accordingly, the effect can be obtained that it becomes easy to offload traffic from the access system.

Hereinafter, the system architecture will be described with reference to FIG. 34. Note that in the description regarding FIG. 34, a description of components similar to those of FIG. 30 will be omitted.

The control apparatus 710 controls the U-plane S-GWs 740-1 and 740-2 and constructs bearers (GTP-U tunnels).

The control apparatus 710 indicates to the U-plane S-GW 740-2 to switch processing depending on a bearer. Note that in the example of FIG. 34, it is assumed that a bearer of identification information "TEID (X)" accesses the data network 704-2 via the P-GW 720-2 in a core system 701-2.

The control apparatus 710 indicates to the U-plane S-GW 740-2 to, if a packet has IP address (A) as its destination IP address and TEID (X), change the source IP address of the packet to IP address (A) and the destination IP address thereof to the IP address of the P-GW 720-2. In other words, the control apparatus 710 indicates to the U-plane S-GW 740-2 to change the destination address of a packet that belongs to a logical path associated with a communication with a predetermined data network (the data network 704-2 in FIG. 34), to the address of a P-GW (the P-GW 720-2 in FIG. 34) corresponding to the predetermined data network. The U-plane S-GW 740-2 has a function of changing the destination address of a packet that belongs to a logical path associated with a communication with a predetermined network to the address of a P-GW corresponding to the predetermined data network in accordance with a command from the control apparatus 710.

Moreover, the control apparatus 710 indicates to the U-plane S-GW 740-2 to change the TEID to a TEID for communication with the P-GW 720-2. The U-plane S-GW 740-2 forwards the packet to the IPsec function 7712, and this packet is encrypted by the IPsec function 7712. The IPsec function 7712 determines which of IPsec GWs 780-1 and 780-2 the packet is forwarded to, based on the destination IP address of the packet. Since the destination IP address of the encrypted packet has been changed to the address of the P-GW 720-2, the IP sec function 7712 forwards the packet to the IPsec GW 780-2.

The IPsec GW 780-2 decrypts the received packet and forwards the packet to the P-GW 720-2.

The control apparatus 710 indicates to the U-plane S-GW 740-2, as a default operation (e.g., an operation on packets other than those having IP address (A) as the destination IP address and TEID (X)), to forward a packet with its contents as they are, without changing the address of the packet. The U-plane S-GW 740-2 forwards a packet to the IPsec function 7712. The IPsec function 7712 encrypts the packet. The IPsec function 7712 determines which of the IPsec GWs 780-1 and 780-2 the packet is forwarded to, based on the destination IP address of the packet. If the destination IP address is IP address (A), which is the address of the virtual S-GW 740, the IPsec function 7712 forwards the packet to the IPsec GW 780-1.

The IPsec GW 780-1 decrypts the received packet and forwards the packet to the P-GW 720-1.

With the above-described operations, it is possible to deploy a core system in which no S-GW is included and only a P-GW for accessing a data network is deployed, at a location near the access system 702. Accordingly, the effect can be obtained that it becomes easy to offload traffic from the access system.

INDUSTRIAL APPLICABILITY

The present invention is applicable to communication systems in which a logical path such as an EPS bearer is created to send and receive packets.

REFERENCE SIGNS LIST

10 Communication apparatus for U-plane
11 Logical path module
12 Packet forward section
13 Data processing section
20 Control apparatus
30 Communication apparatus for C-plane
40 Other-end communication apparatus
50 Logical path
101 Logical path management section
102 Encapsulation function section
103 Decapsulation function section
201, 202 Communication section
203 Route and action calculation section
204 Packet forward management section
205 Packet forward rule management section
206 Control section
300 U-plane P-GW (PDN Gateway for User plane)
311 GTP-U tunnel module
312 Switch (OFS: OpenFlow Switch)
320 Controller (OFC: Openflow Controller)
330 C-plane P-GW (PDN Gateway for Control plane)
340 S-GW (Serving Gateway)
350 GTP-U tunnel
360 Radio base station eNB
370 MME
500 U-plane S-GW
511 GTP-U tunnel module
512 Switch (OFS: OpenFlow Switch)
520 Controller (OFC: Openflow Controller)
530 C-plane S-GW
540 P-GW
550 GTP-U tunnel
560 Radio base station eNB
570 MME

What is claimed is:

1. A serving gateway in a communication system including a plurality of PDN (Packet Data Network) gateways, comprising:
    a control interface to a control apparatus which controls the serving gateway;
    a control-plane serving gateway; and
    a plurality of user-plane serving gateways each associated with the plurality of PDN gateways,
    wherein each of the plurality of user-plane serving gateways comprises:
        a first logical path manager that manages a first logical path with a PDN gateway associated with the serving gateway;
        a second logical path manager that manages a second logical path with a base station; and
        a switch that exchanges packets and information related to a logical path with at least one of the first and second logical path managers in accordance with an operation rule, which is notified from the control apparatus in response to a request from a control plane for the first and second logical paths, wherein the information related to the logical path includes, as packet metadata, at least one of identification information for identifying the logical path and a sequence number in at least one of the first and second logical paths.

2. The serving gateway according to claim 1, wherein the switch exchanges the information related to the logical path via a communication interface for packet transfer.

3. The serving gateway according to claim 1, wherein the switch exchanges the information related to the logical path, along with packet transfer via a communication interface for packet transfer.

4. The serving gateway according to claim 1, wherein the switch identifies a packet, based on the identification information, and exchanges information related to a logical path to which the identified packet belongs with at least one of the first and second logical path managers.

5. The serving gateway according to claim 1, wherein the first and second logical path managers are capable of encapsulating a packet by using the information related to the logical path termination processing that is received from the switch.

6. The serving gateway according to claim 1, wherein the first and second logical path managers are capable of sending, to the switch, a decapsulated packet and information related to the logical path to which this packet belongs.

7. The serving gateway according to claim 1, wherein the serving gateway executes the first logical path manager, the second logical path manager and the switch by using software operating on virtual machine.

8. A communication method for a serving gateway in a communication system including a plurality of PDN (Packet Data Network) gateways, wherein the serving gateway comprises:

a control interface to a control apparatus which controls the serving gateway;

a control-plane serving gateway; and a plurality of user-plan serving gateways each associated with the plurality of PDN gateways, the method comprising: at each of the plurality of user-plane serving gateways, by a first logical path manager, managing a first logical path with a PDN gateway associated with the serving gateway;

by a second logical path manager, managing a second logical path with a base station; and by a switch, exchanging packets and information related to a logical path with at least one of the first and second logical path managers in accordance with an operation rule, which is notified from a control apparatus in response to a request from a control plane for the first and second logical paths, wherein the information related to the logical path includes, as packet metadata, at least one of identification information for identifying the logical path and a sequence number in at least one of the first and second logical paths.

* * * * *